United States Patent
Burriesci et al.

(10) Patent No.: US 12,154,144 B2
(45) Date of Patent: *Nov. 26, 2024

(54) SYSTEMS AND METHODS FOR DYNAMICALLY INSERTING CONTENT ITEM SLOTS IN AN INFORMATION RESOURCE

(71) Applicant: GOOGLE LLC, Mountain View, CA (US)

(72) Inventors: Matthew Burriesci, Mountain View, CA (US); Keith Wright, Mountain View, CA (US); Willa Angel Chen, San Jose, CA (US); Joshua Nedelka, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,480

(22) Filed: May 17, 2023

(65) Prior Publication Data
US 2023/0368250 A1 Nov. 16, 2023

Related U.S. Application Data

(63) Continuation of application No. 16/091,455, filed as application No. PCT/US2016/034595 on May 27, 2016, now Pat. No. 11,694,237.

(Continued)

(51) Int. Cl.
*G06Q 30/00* (2023.01)
*G06F 16/957* (2019.01)
(Continued)

(52) U.S. Cl.
CPC ....... *G06Q 30/0277* (2013.01); *G06F 16/957* (2019.01); *G06F 16/958* (2019.01); *G06F 16/972* (2019.01); *H04L 67/02* (2013.01)

(58) Field of Classification Search
None
See application file for complete search history.

(56) References Cited

U.S. PATENT DOCUMENTS

| 5,774,109 A | * | 6/1998 | Winksy | G06F 3/0485 |
| | | | | 345/169 |
| 7,996,000 B1 | * | 8/2011 | Dubinko | H04W 4/18 |
| | | | | 455/414.4 |

(Continued)

FOREIGN PATENT DOCUMENTS

EP 2843607 A1 3/2015

OTHER PUBLICATIONS

Search Report and Written Opinion in International Application No. PCT/US2016/034595 dated Sep. 5, 2016, 10 pages.

(Continued)

*Primary Examiner* — Christopher Stroud
(74) *Attorney, Agent, or Firm* — MARSHALL, GERSTEIN & BORUN LLP

(57) ABSTRACT

Systems and methods for dynamically inserting content into webpages. A computing device can receive an information resource. The computing device can receive a content item for insertion at one of the candidate content insertion locations of the information resource. The computing device can identify candidate content insertion locations for insertion of the content item based on locations of one or more elements on the information resource. The computing device can monitor for a scroll event on the information resource. The computing device can identify a portion of the information resource to be displayed within the viewport of the application subsequent to processing the event. The computing device can determine that one of the candidate insertion locations is within or below the viewport. The computing device can set a content slot at the determined content (Continued)

insertion location. The computing device can insert, at the content slot, the content item.

18 Claims, 6 Drawing Sheets

Related U.S. Application Data

(60) Provisional application No. 62/274,594, filed on Jan. 4, 2016.

(51) Int. Cl.
*G06F 16/958* (2019.01)
*G06Q 30/0241* (2023.01)
*H04L 67/02* (2022.01)

(56) References Cited

U.S. PATENT DOCUMENTS

| | | | | |
|---|---|---|---|---|
| 8,577,181 | B1* | 11/2013 | Badros | G06Q 30/0277 |
| | | | | 382/206 |
| 10,140,633 | B1* | 11/2018 | Jaye | G06Q 30/0277 |
| 2004/0145462 | A1* | 7/2004 | Ambrose | G09F 21/04 |
| | | | | 340/441 |
| 2004/0148625 | A1* | 7/2004 | Eldering | H04N 21/2547 |
| | | | | 725/35 |
| 2006/0206380 | A1* | 9/2006 | Joo | G06Q 30/0251 |
| | | | | 705/14.49 |
| 2010/0325533 | A1 | 12/2010 | Artz | |
| 2011/0035263 | A1* | 2/2011 | Ramanathan | G06Q 30/02 |
| | | | | 705/14.4 |
| 2014/0040423 | A1* | 2/2014 | Goh | G06Q 30/0241 |
| | | | | 709/217 |
| 2014/0095514 | A1* | 4/2014 | Filev | G06F 40/106 |
| | | | | 707/748 |
| 2014/0108941 | A1 | 4/2014 | Joel et al. | |
| 2014/0172565 | A1* | 6/2014 | Alon | G06Q 30/0275 |
| | | | | 705/14.54 |
| 2014/0189487 | A1 | 7/2014 | Kwan et al. | |
| 2014/0289058 | A1* | 9/2014 | Suzuki | G06Q 30/0277 |
| | | | | 705/14.73 |
| 2015/0046253 | A1* | 2/2015 | Finkelstein | G06Q 30/0243 |
| | | | | 705/14.42 |
| 2015/0073922 | A1* | 3/2015 | Epperson | G06Q 30/0277 |
| | | | | 705/14.73 |
| 2015/0356570 | A1* | 12/2015 | Goldsmid | G06Q 30/0249 |
| | | | | 705/7.29 |
| 2016/0027060 | A1* | 1/2016 | Kobayashi | G09G 5/14 |
| | | | | 705/14.64 |
| 2016/0180409 | A1* | 6/2016 | Shah | G06Q 30/0277 |
| | | | | 705/14.66 |
| 2017/0024764 | A1* | 1/2017 | Mooser | G06F 16/9535 |
| 2017/0064609 | A1* | 3/2017 | Park | H04L 12/189 |
| 2018/0018332 | A1* | 1/2018 | Diaz | G06F 16/9535 |

OTHER PUBLICATIONS

International Preliminary Report on Patentability in International Application No. PCT/US2016/034595 dated Mar. 26, 2018, 20 pages.

Ryabov et al., "Redefining Lazy Loading With Lazy Load XT", Smashing Magazine, Feb. 3, 2015, 13 pages.

* cited by examiner

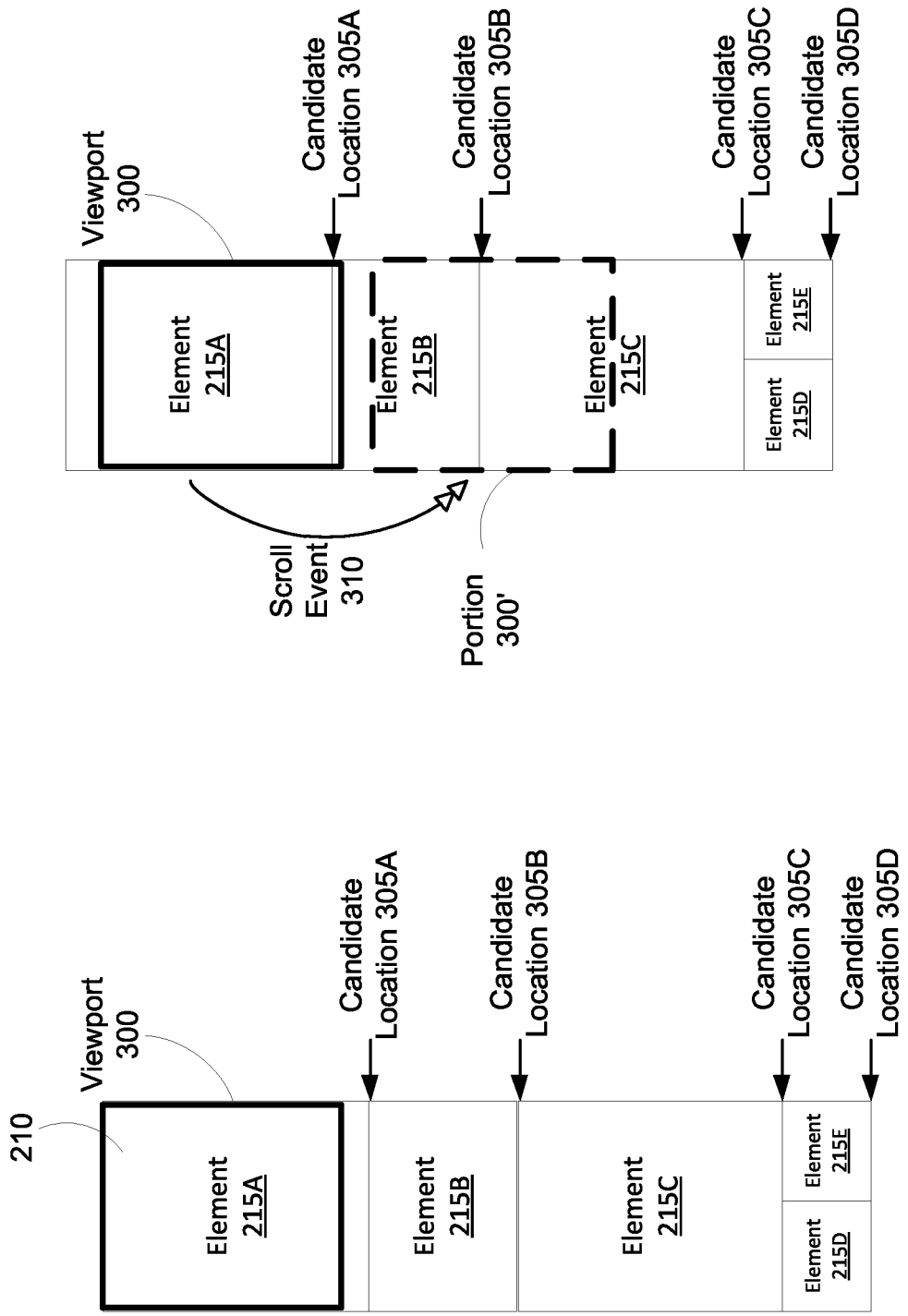

SYSTEMS AND METHODS FOR DYNAMICALLY INSERTING CONTENT ITEM SLOTS IN AN INFORMATION RESOURCE

CROSS-REFERENCE TO RELATED APPLICATIONS

The present application is a continuation of U.S. patent application Ser. No. 16/091,455, which is a national stage application of PCT Patent Application No. PCT/US16/32595, filed on May 27, 2016, which claims priority to U.S. Provisional Patent Application No. 62/274,594, filed on Jan. 4, 2016. Each of the above-identified applications is hereby incorporated herein by reference in its entirety.

BACKGROUND

In a computer networked environment such as the internet, third-party content providers provide third-party content items for display on end-user computing devices. These third-party content items can be linked to web pages associated with the third-party content providers. These third-party content items can include content identifying the third-party content provider that provided the content item.

SUMMARY

At least one aspect is directed to a method of dynamically inserting content into webpages via a computer networked environment. The client device can receive an information resource for display within a viewport of an application executing on the client device. The client device can identify a first candidate content insertion location and a second candidate content insertion location for insertion of the third-party content item based on locations of one or more elements on the information resource. The second candidate content insertion location can be below the first candidate content insertion location on the information resource. The client device can receive a third-party content item for insertion at one of the first candidate content insertion location or the second candidate content insertion location of the information resource. The client device can monitor for a scroll event on the information resource, the scroll event having one or more scroll parameters. The client device can identify, based on the one or more scroll parameters of the scroll event, a first portion of the information resource to be displayed within the viewport of the application subsequent to processing the scroll event. The client device can determine that the first candidate content insertion location is above the first portion and that the second candidate insertion location is within or below the viewport. The client device can set, within the information resource, a third-party content slot at the second candidate content insertion location responsive to determining that the first candidate content insertion location is above the first portion and that the second candidate insertion location is within or below the viewport. The client device can insert, at the third-party content slot, the third-party content item for display at the second candidate content insertion location on the information resource.

In some implementations, the client device can monitor a computing performance metric for the client device. In some implementations, the client device can determine that the computing performance metric is above a performance threshold. In some implementations, setting the third-party content slot can further comprise setting the third-party content slot, responsive to determining that the computing performance metric is above the performance threshold.

In some implementations, the client device can identify a size of the viewport of the application. In some implementations, the client device can set a size of the third-party content slot based on the size of the viewport of the application. In some implementations, the client device can modify the third-party content item to substantially match a size of the of the third-party content slot to fit the third-party content item within the third-party content slot.

In some implementations, the one or more scroll parameters can include a scroll speed corresponding to the scroll event. In some implementations, the client device can determine, based on the scroll speed and subsequent to processing the scroll event, that a second portion of the information resource corresponding to the first candidate content insertion location is above the first portion of the information resource that is within the viewport of the application. In some implementations, the client device can insert, responsive to determining that the second portion of the information resource corresponding to the first candidate content insertion location is above the first portion of the information resource that is within the viewport of the application, the third party content slot at the second candidate content insertion location for displaying the received third-party content item.

In some implementations, the client device can receive a plurality of input actions performed on a touchscreen of the client device. In some implementations, the client device can determine, for the input actions, locations on the touchscreen at which the input actions were performed. In some implementations, the client device can, based on the locations on the touchscreen at which the input actions were performed, a range of coordinates of the touchscreen on which the input actions were performed. In some implementations, the client device can insert an action item to interact with the third-party content item at a location on the third-party content item that corresponds to the range of coordinates of the touchscreen on which the input actions were performed when the third-party content item is displayed within the third-party content slot.

In some implementations, the client device can receive a conversion prediction value calculated by a remote device, the conversion prediction value indicating a likelihood of a conversion event on the content item. In some implementations, the client device can determine that the conversion prediction value is above a conversion likelihood threshold. In some implementations, setting the third-party content slot can further comprise setting the third-party content slot responsive to determining that the conversion prediction value is above the conversion likelihood threshold.

In some implementations, identifying the first candidate content insertion location and the second candidate content insertion location can further comprise identifying the first candidate content insertion location and the second candidate content insertion location below the portion of the information resource visible within the viewport of the application while a top of the information resource is visible within the viewport. In some implementations, the client device can identify a height and a width of the viewport of the application. In some implementations, setting the third-party content slot can further comprise setting a height of the third-party content slot to the height of the viewport and a width of the third-party content slot to the width of the viewport. In some implementations, receiving the third-party content item can further comprise receiving the third party content item having a height equal to the height of the viewport and a width equal to the width of the viewport.

In some implementations, processing a second scroll event can display a second portion of the information resource below the first portion of the information resource. In some implementations, the client device can interrupt the scroll event to display the first portion of the information resource.

In some implementations, the client device can identify a size of the information resource. In some implementations, the client device can compare the size of the information resource to a threshold page size. In some implementations, the client device can transmit, responsive to determining that the size of the information resource is greater than the threshold page size, a request for third-party content. In some implementations, receiving the third-party content item can further comprise receiving the third-party content item subsequent to transmitting the request for third-party content At least one aspect is directed to a system for dynamically inserting content into webpages via a computer networked environment. A client device having one or more processors can receive an information resource for display within a viewport of an application executing on the client device. The client device can receive a third-party content item for insertion at one of a first candidate content insertion location or a second candidate content insertion location of the information resource. A location identification module executing on the one or more processors can cause the client device to identify a first candidate content insertion location and a second candidate content insertion location for insertion of the third-party content item based on locations of one or more elements on the information resource. The second candidate content insertion location can be below the first candidate content insertion location on the information resource. An event detection module executing on the one or more processors can cause the client device to monitor for a scroll event on the information resource. The scroll event can have one or more scroll parameters. The location identification module can cause the client device to identify, based on the one or more scroll parameters of the scroll event, a first portion of the information resource to be displayed within the viewport of the application subsequent to processing the scroll event. The location identification module can cause the client device to determine that the first candidate content insertion location is above the first portion and that the second candidate insertion location is within or below the viewport. A content insertion module executing on the one or more processors can cause the client device to set, within the information resource, a third-party content slot at the second candidate content insertion location responsive to determining that the first candidate content insertion location is above the first portion and that the second candidate insertion location is within or below the viewport. The content insertion module can cause the client device to insert, at the third-party content slot, the third-party content item for display at the second candidate content insertion location on the information resource.

In some implementations, the event detection module can cause the client device to monitor a computing performance metric for the client device. In some implementations, the event detection module can cause the client device to determine that the computing performance metric is above a performance threshold. In some implementations, the content insertion module can cause the client device to set the third-party content slot, responsive to determining that the computing performance metric is above the performance threshold In some implementations, the content insertion module can cause the client device to identify a size of the viewport of the application. In some implementations, the content insertion module can cause the client device to set a size of the third-party content slot based on the size of the viewport of the application. In some implementations, the content insertion module can cause the client device to modify the third-party content item to substantially match a size of the of the third-party content slot to fit the third-party content item within the third-party content slot.

In some implementations, the one or more scroll parameters can include a scroll speed corresponding to the scroll event. In some implementations, the location identifier module can cause the client device to determine, based on the scroll speed and subsequent to processing the scroll event, that a second portion of the information resource corresponding to the first candidate content insertion location is above the first portion of the information resource that is within the viewport of the application. In some implementations, the content insertion module can cause the client device to insert, responsive to determining that the second portion of the information resource corresponding to the first candidate content insertion location is above the first portion of the information resource that is within the viewport of the application, the third party content slot at the second candidate content insertion location for displaying the received third-party content item.

In some implementations, the event detection module can cause the client device to receive a plurality of input actions performed on a touchscreen of the client device. In some implementations, the location identifier module can determine, for the input actions, locations on the touchscreen at which the input actions were performed. In some implementations, the location identifier module can cause the client device to determine, based on the locations on the touchscreen at which the input actions were performed, a range of coordinates of the touchscreen on which the input actions were performed. In some implementations, the content insertion module can cause the client device to insert an action item to interact with the third-party content item at a location on the third-party content item that corresponds to the range of coordinates of the touchscreen on which the input actions were performed when the third-party content item is displayed within the third-party content slot.

In some implementations, the client device can receive a conversion prediction value calculated by a remote device. The conversion prediction value can indicate a likelihood of a conversion event on the content item. In some implementations, the content insertion module can cause the client device to set the third-party content slot responsive to determining that the conversion prediction value is above the conversion likelihood threshold In some implementations, the location identification module can cause the client device to identify the first candidate content insertion location and the second candidate content insertion location below the portion of the information resource visible within the viewport of the application while a top of the information resource is visible within the viewport. In some implementations, the location identification module can cause the client device to identify a height and a width of the viewport of the application. In some implementations, the content insertion module can cause the client device to set a height of the third-party content slot to the height of the viewport and a width of the third-party content slot to the width of the viewport. In some implementations, the client device can receive the third party content item having a height equal to the height of the viewport and a width equal to the width of the viewport.

In some implementations, the location identification module can cause the client device to determine that processing a second scroll event would display a second portion of the information resource below the first portion of the information resource. In some implementations, the content insertion module can cause the client device to interrupt the scroll event to display the first portion of the information resource.

In some implementations, the location identification module can cause the client device to identify a size of the information resource. In some implementations, the location identification module can cause the client device to compare the size of the information resource to a threshold page size. In some implementations, the client device can transmit, responsive to determining that the size of the information resource is greater than the threshold page size, a request for third-party content. In some implementations, the client device can receive the third-party content item subsequent to transmitting the request for third-party content.

It will be appreciated that aspects and implementations can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects and implementations may also be implemented using suitable apparatus which may take the form of programmable computers running computer programs arranged to implement the invention. Aspects and implementations may be combined and features described in the context of one implementation may be combined with features of other implementations.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 3A-3D are block diagrams of an information resource and a viewport showing a portion of an element of the information resource, according to an illustrative implementation;

DETAILED DESCRIPTION

Figure 1:
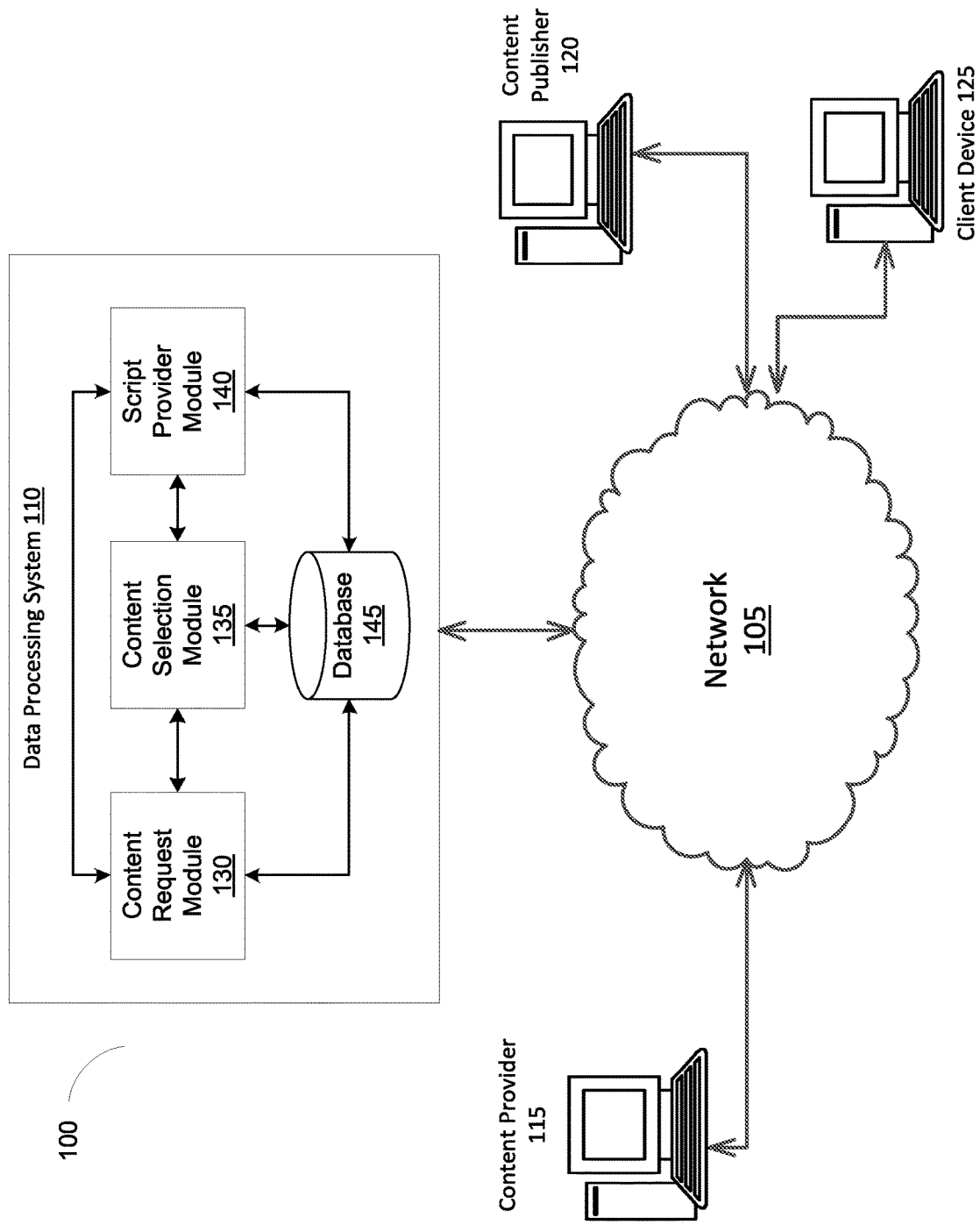
FIG. 1 is a block diagram depicting one implementation of an environment for dynamically inserting content on an information resource in a computer network environment, according to an illustrative implementation.

Following below are more detailed descriptions of various concepts related to, and implementations of, methods, apparatuses, and systems of dynamically inserting content on an information resource in a computer network environment. The various concepts introduced above and discussed in greater detail below may be implemented in any of numerous ways, as the described concepts are not limited to any particular manner of implementation.

Content items may be presented on an information resource (e.g., webpage) through interstitials or a separate window (e.g., pop-up windows) along with primary content (e.g., main body text on the webpage). From a human-computer interaction (HCI) perspective, such presentation techniques, however, may interfere with the user's focus on the primary content on the information resource and may lead the user to ignore the content item altogether, thereby reducing the effectiveness of the presentation. In addition, interstitials may be implemented by presetting the position and size of the content item slot on the information resource. Furthermore, separate popup windows may be implemented by inserting a script into the information resource that causes the instantiation of the separate popup window with additional content. Due to the predefined natures of interstitials and separate windows, such presentation techniques do not take into account various events and signals on a client device, such as user signals including scroll events, and signals pertaining to computing resources and their performance, into the insertion of content items on or with the primary content of the information resource.

In existing techniques such as those described above, content slots are predefined within a DOM tree or script of an information resource. As a result, content slots are inserted in the information resource and requests for content are made to content servers to retrieve content to display within these content slots. The interaction with the content may vary due to multiple factors, including the end user's behavior with the application via which the information resource is displayed. For users that are less inclined to interact with content, displaying too many content items may reduce the user's browsing experience with the information resource as well as unnecessarily increase the amount of data transmitted to the client device to render the information resource. In addition, latencies are introduced when content requests are made to content servers and content items are received and provided for display. As such, these presentation techniques may lead to increased bandwidth usage and latency for the client device and the servers providing the information resource and content item, respectively.

To reduce the bandwidth and increased latency introduced due to the number of content requests transmitted to a third-party content server, among other challenges, the present disclosure provides techniques for dynamically inserting a content item into an information resource based on events and signals of the client device. In one implementation, a client device can receive, from a content publisher computing device, an information resource together with a dynamic content insertion script. When executed on the client device, the dynamic content insertion script can cause the client device to identify candidate locations for inserting content on the information resource. Candidate locations for inserting content can include, for example, above or below one or more elements (e.g., document object model (DOM) tree elements) that span a predetermined percentage of the width of the information resource. Other candidate locations for inserting content can above or below one or more elements that are left, right, or center justified that span the predetermined percentage of the width of the information resource. In addition, the dynamic content insertion script can cause the client device to monitor for events and signals on the client device. For example, the client device can detect a scroll event, identify the scroll position and scroll speed based on the scroll event, and predict or determine which portion of the information resource will be displayed after processing the scroll event. Using the identified portion, the client device can identify which of the candidate locations to insert the content item, so as to assure that the content item is visible within the information resource when the identified portion of the information resource comes into the viewport. By predicting or determining a portion of the information resource that will be displayed after processing a scroll event, content may be delivered to the user more quickly than by basing content requests on the display of the information resource itself. Other events and signals that the client device can monitor in determining where to include the content item for include, for example, bandwidth, latency, and usage of computing resources. In some implementations, by inserting the content item into a location where one or more elements span the full width of the information resource, this technique does not interfere with the user's experience of the information resource, thereby improving human-computer interaction.

Moreover, dynamically determining where to insert the content item on the information resource may reduce network bandwidth usage between the servers and the client device and free up computer resources for the client device. In some implementations, the client device can pre-fetch a content item from either the content publisher computing device or a content server, without inserting or displaying the content item in the information resource. In some implementations, the client device can wait and determine whether to transmit a request for a content item to the content server subsequent to identifying a candidate location to insert the content item. In either case, compared to interstitials, separate windows, or prefixed content item slots, the client device may send a lower number of requests for content items to the content server, thereby alleviating network bandwidth resources.

At least one aspect is directed to a method of dynamically inserting content into webpages via a computer networked environment. A client device can receive an information resource for display via a viewport of an application executing on the client device. The client device can identify a first candidate content insertion location and a second candidate content insertion location for insertion of the third-party content item based on locations of one or more elements on the information resource. The second candidate content insertion location can be located below the first candidate content insertion location on the information resource. The client device can receive a third-party content item for insertion at one of the first candidate content insertion location or the second candidate content insertion location of the information resource. The client device can monitor for a scroll event on the information resource. The scroll event can have one or more scroll parameters. The client device can identify, based on the one or more scroll parameters of the scroll event, a first portion of the information resource to be displayed within the viewport of the application subsequent to processing the scroll event. The client device can determine that the first candidate content insertion location is above the first portion and that the second candidate insertion location is within or below the viewport. The client device can set, within the information resource, a third-party content slot at the second candidate content insertion location responsive to determining that the first candidate content insertion location is above the first portion and that the second candidate insertion location is within or below the viewport. The client device can insert the third-party content item for display at the second candidate content insertion location on the information resource.

FIG. 1 is a block diagram depicting one implementation of an environment for dynamically inserting content on an information resource in a computer network environment. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one client device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items for display on information resources at the client device 125. The content provided by the content provider computing device 115 can include third party content items or creatives for display on information resources, such as a website or web page that includes primary content, e.g. content provided by the content publisher computing device 120. The content items can also be displayed on a search results web page. For instance, the content provider computing device 115 can provide or be the source of content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other client device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items from the content provider computing devices 115. For instance, the content publisher computing device 120 can operate the website of a company and can provide content about that company for display on web pages of the website. The web pages can include content slots configured for the display of third party content items of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items configured for display in a content slot of a web page). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The end user computing devices 125 can be communication devices through which an end user can submit requests to receive content. The requests can be requests to a search engine and the requests can include search queries. In some implementations, the requests can include a request to access a web page.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120, and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system. The data processing system 110 can include at least one content request module 130, at least one content selection module 135, at least one script provider module 140 and at least one database 145. The content item selection 130, the content selection module 135 and the script provider module 140 each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client device 125) via the network 105.

The content request module 130, the content selection module 135, and the script provider module 140 can include or execute at least one computer program or at least one script. The content request module 130, the content selection module 135, and the script provider module 140 can be separate components, a single component, or part of the data processing system 110. The content request module 130, the content selection module 135, and the script provider module 140 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, content items, and dynamic content insertion script, among others, to serve to a client device 125. In some implementations, the web pages, portions of webpages, and content items (e.g., advertisements) can include those illustratively depicted in FIGS. 3A-3D. Additional details of the contents of the database 145 will be provided below.

The content request module 130 can receive a request for content from the client device 125. The request for content can include a request for a content item. The request for content can include an address or identifier for the content item. For example, the request for content can include Uniform Resource Locator (URL) referring to a specific resource such as a third-party content item (e.g., "www.example_third_party.com/ad_123579.html"). The request for content can correspond to a not yet inserted content item slot on an information resource received by the client device 125. In some implementations, the request for content may lack a size specification or a reference to a particular content item slot. The host name of the URL for the information resource may differ from the host name of the URL for the content item. For example, the URL for the information resource can be "www.example_publisher.com/index.html" but the URL for the content item can be "www.example_thirdparty.com/content_item_271828.html." In some implementations, the content selection module 135 can identify a type of request based on the URL. The type of request can include a request for a content item or a request for an information resource.

In some implementations, the content request module 130 or the content publisher computing device 120 can receive a request for an information resource that can include an indicator indicating a request for a dynamic content insertion script. For example, the request for the information resource can include a header including an indicator specifying the content request module 130 or the content publisher computing device 120 to send the dynamic content insertion script along with the information resource to the client device 125. In some implementations, the information resource can include the dynamic content insertion script inserted in the script for the information resource. In some implementations, the information resource can include a script for retrieving the dynamic content insertion script for insertion into the information resource.

The content selection module 135 or the content publisher computing device 120 can determine the content to transmit to the client device 125. The content selection module 135 or the content publisher computing device 120 can identify the address or identifier for the information resource and the content item included in the request for content. The content selection module 135 can access the database 145 and select the information resource or the content item identified by the address or identifier. The content selection module 135 can transmit a request to the content provider 115 or the content publisher 120 to access, retrieve, or otherwise receive the information resource or content item identified by the address or identifier. The content selection module 135 can transmit or forward the information resource or content item identified by the address or identifier to the client device 125. For example, the data processing system 110 can receive from a client device 125 a request for an information resource. The request may include an address referring to one of the content publishers 120. In this example, the content selection module 135 can forward the request for the information resource to the respective content publisher 120. Upon receiving the information resource from the respective content publisher 120, the content selection module 135 can forward the content document to the client device 125 that made the original request, along with the dynamic content insertion script.

The script provider module 140 can receive a request for the dynamic content insertion script from the content publisher computing device 120 for insertion into an information resource to be provided to the client device 125. The script provider module 140 can, responsive to receiving the request for the dynamic content insertion script from the content publisher computing device 120, transmit the dynamic content insertion script to the content publisher computing device 120 for insertion or embedding the dynamic content insertion script into the information resource. In some implementations, the script provider module can receive a request for a up-to-date version of the dynamic content insertion script. For example, the script provider module 140 can periodically receive a request for the dynamic content insertion script from the content publisher computing device 120, and in response transmit the most up-to-date version of the dynamic content insertion script. In turn, the content publisher computing device 120 can insert or otherwise embed the updated dynamic content insertion script into one or more information resources. In this example, when the content publisher computing device 120 receives a request for an information resource from the client device 125, the content publisher computing device 120 transmit the respective information resource along with the dynamic content insertion script to the client device 125. In some implementations, the script provider module 140 can receive the request for the dynamic insertion script from the client device 125, along with the request for the information resource. In some implementations, the script provider module 140, in conjunction with the other modules of the data processing system 110, can transmit the information resource with the dynamic insertion script embedded to the client device 125.

In some implementations, the script provider module 140 can determine whether the information resource of the content publisher computing device 120 is suitable for insertion of the dynamic content insertion script. In some implementations, the script provider module 140 can identify the information resource either already received by the client device 125 or to be sent to the client device 125. In some implementations, the script provider module 140 can identify the size of the information resource. The size of the information resource can include the height and width of the information resource measured in pixel, inch, or metric units. In some implementations, the script provider module 140 can compare the size of the information resource to a threshold length. In some implementations, the script provider module 140, responsive to determining that the size of the information resource is greater or equal to than the threshold length, can determine that the information resource of the content publisher computing device 120 is suitable for insertion of the dynamic content insertion script and transmit the dynamic content insertion script to the content publisher computing device 120. In some implementations, the script provider module 140, responsive to determining that the size of the information resource is less than the threshold length, can determining that the information resource of the content publisher computing device 120 is unsuitable for insertion of the dynamic content insertion script. In some implementations, the script provider module 140 can, responsive to determining that the information resource of the content publisher computing device 120 is unsuitable for insertion of the dynamic content insertion script, transmit an indicator indicating that the information resource of the content publisher computing device 120 is unsuitable to the content publisher computing device 120.

The dynamic content insertion script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JAVASCRIPT, among others. The computer-executable instructions can be executed by an application of the client device 125, for example, the application that caused the client device to transmit the request for content received by the content request module 130. The application can include, for example, an Internet browser, mobile application, or any other computer program capable of reading and executing the computer-executable instructions. In brief overview, the computer-executable instructions, when executed by a processor of the client device 125, can cause an application of the client device to: (1) identify a first candidate content insertion location and a second candidate content insertion location for insertion of the third-party content item based on locations of one or more elements on the information resource; (2) monitor for a scroll event on the information resource, the scroll event having one or more parameters; (3) identify, based on the one or more parameters of the scroll event, a first portion of the information resource to be displayed within the viewport of the application subsequent to processing the event; (4) determine that the first candidate content insertion location is above the first portion and that the second candidate insertion location is within or below the viewport; (5) set, within the information resource, a third-party content slot at the second candidate content insertion location responsive to determining that the first candidate content insertion location is above the first portion and that the second candidate insertion location is within or below the viewport; and (6) insert, at the third-party content slot, the third-party content item for display at the second candidate content insertion location on the information resource. Additional details relating to the functions of the dynamic content insertion script are provided herein with respect to FIGS. 2 and 3A-3D.

Figure 2:
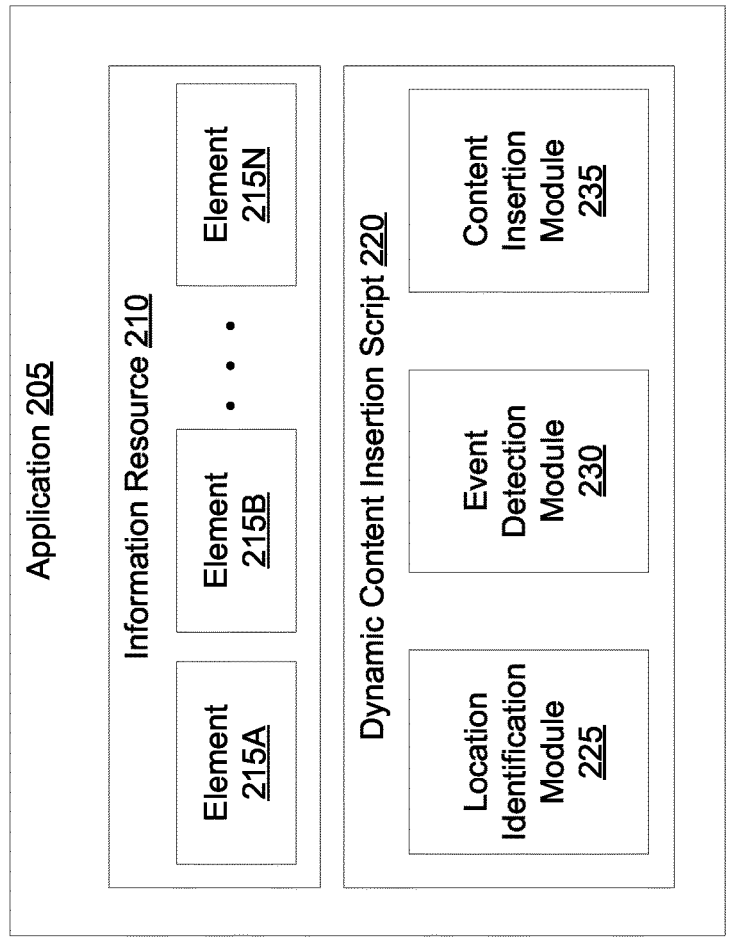
FIG. 2 is a block diagram depicting one implementation of a dynamic content insertion system, according to an illustrative implementation.

FIG. 2 is a block diagram depicting one implementation of a dynamic content insertion system 200, according to an illustrative implementation. The dynamic content insertion system 200 can be run or otherwise be executed by one or more processors of a client device 125 or any other computing device, such as those described below in FIG. 5. The dynamic content insertion system 200 can include an application 205, an information resource 210, and an dynamic content insertion script 220. The application 205 can include, for example, an Internet browser, mobile application, or any other computer program capable of executing or otherwise invoking computer-executable instructions, such as the computer-executable instructions included in the information resource 210, one or more elements 215A-N, and dynamic content insertion script 220. The information resource 210 can include one or more one or more elements 215A-N. The one or more elements 215A-N can include, for example, Hypertext Markup Language (HTML) elements, Document Object Model (DOM) tree elements, such as a form, link, or image element, and Cascading Style Sheets (CSS) elements. The information resource 210 can be received by the application 205 along with the dynamic content insertion script 220 from the content publisher computing device 120 or the one or more modules of the data processing system 110. The dynamic content insertion script 220 can include one or more modules, such as the location identification module 225, event detection module 230, and content insertion module 235.

Referring to FIGS. 3A-3D, FIGS. 3A-3D each are displays depicting a viewport 300 for dynamically inserting content on an information resource, according to an illustrative implementation. In the example depicted in FIGS. 3A-3D, FIGS. 3A-3D each include the information resource 210, five elements 215A-E, and a viewport 300. The dimensions of the elements 215A-E may be of variable width and length. In the example depicted in FIGS. 3A-3D, each element 215A-E are of different lengths and three of the elements 215A-C span the width of the viewport 300. The viewport 300 can include the portion of the information resource 210 visible through the application 205. The viewport 300 can include, for example, the visible area of the webpage (e.g., information resource 210) through an Internet browser (e.g., application 205). The viewport 300 can display any portion of the information resource 210 visible through the application 205, including the one or more elements 215A-E. The viewport 300 of the application 205 can be adjusted, shifted, or otherwise changed by scrolling on the application 205. In some implementations, the scrolling feature of the application 205 can be vertical, horizontal, or both and move along the respective axis of the information resource 210. The dimensions of the viewport 300 can be adjusted or otherwise modified by resizing the application 205. In the examples depicted in FIGS. 3A-3D, the scroll axis of the information resource 210 and lengths of the five elements 215A-E may be vertical.

Figure 3D:
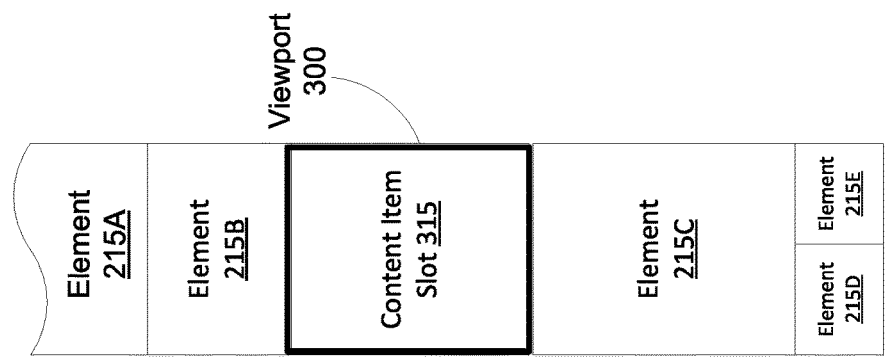

In brief overview, at FIG. 3A, the application 205 can load and display the information resource 210 at the top initial position, thereby making a portion of the first element 215A visible through the viewport 300. In addition, the dynamic content insertion script 220 can identify a first candidate content insertion location 305A, a second candidate content insertion location 305B, a third candidate content insertion location 305C, and a fourth candidate content insertion location 305D, all of which may be positioned below the viewport 300 in the example depicted in FIG. 3A. At FIG. 3B, the application 205 can detect a scroll event 310 indicating a downward scroll on the information resource 210, thereby shifting the information resource 210 upward and causing the first candidate content insertion location 305A to come into range of the viewport 300. When the scroll event 310 is first detected, the dynamic content insertion script 220 can include instructions to cause the client device to determine that subsequent to processing the scroll event 310, the first candidate content insertion location 305A will be out of the range of the viewport 300' whereas the second candidate content insertion location 305B will be within the range of the viewport 300 based on the identified scroll parameters, such as the scroll amount, scroll speed, and scroll direction, among others. At FIG. 3C, using the predicted viewport 300', the dynamic content insertion script 220 can insert the content item slot 315 at the second candidate content insertion location 305B. At FIG. 3D, the application 205 can have finished processing the scroll event 310 and shift the information resource 210 upward so that the content item slot 315 can come into the range of the viewport 300. In this way, content can be delivered in advance of actual display of the content item slot in the viewport and the content may be delivered to the user more quickly such that the user experience may be improved.

Referring again to FIG. 2 in conjunction with FIGS. 3A-3D, the client device 125 can receive the information resource 210 for display within the viewport 300 of the application 205 executing on the client device 125. In some implementations, the client device 125 can transmit a request for an information resource 210 to the content publisher computing device 120 or the data processing system 110. The request for the information resource can include an address or identifier for the information resource. For example, the request for content can include Uniform Resource Locator (URL) referring to a specific resource such as a webpage (e.g., "www.example_publisher.com/index.html"). In some implementations, the client device 125 can, subsequent to transmitting the request for the information resource 210, receive the information resource 210. In some implementations, the client device 125 can receive the dynamic content insertion script 220 along with the information resource 210. The application 205 executing on the client device 125 can process and run code included in the information resource 210 and the dynamic content insertion script 220 included or otherwise embedded in the information resource 210.

The location identification module 225 can include instructions to cause the client device 125 to identify one or more candidate content insertion locations 305A-N, for insertion of a third-party content item based on the one or more elements 215A-N of the information resource 210. In some implementations, the location identification module 225 can include instructions to cause the client device 125 to identify one or more elements 215A-N that span a predetermined percentage of the width of the viewport 300. In some implementations, the location identification module 225 can include instructions to cause the client device 125 to identify the one or more elements 215A-N based on a position, alignment, or justification (e.g., left, right, or center justification) of the respective element 215A-N. For example, the one or more elements 215A-N identified can span 66% to 100% of the width of the viewport 300. In some implementations, the location identification module 225 can include instructions to cause the client device 125 to identify one or more elements 215A-N located above or below the range of the viewport 300. In some implementations, location identification module 225 can include instructions to cause the client device 125 to identify the boundaries, edges, or coordinates of the identified one or more elements 215A-N as the one or more candidate content insertion locations 305A-N. For example, as depicted in FIG. 3A, the location identification module 225 can include instructions to cause the client device 125 to identify elements 215B and 215C as below the range of the viewport 300 (e.g., below the fold). Using the identified element 215B, the location identification module 225 can include instructions to cause the client device 125 to identify the top edge of the element 215B as the first candidate content insertion location 305A and the bottom edge of the element 215B as the second candidate content insertion location 305B. Using the identified element 215C, the location identification module 225 can include instructions to cause the client device 125 to identify the bottom edge of the element 215C as the third candidate content insertion location 305C. By identifying the edges of the one or more elements 215A-N, the location identification module 225 can include instructions to cause the client device 125 to later insert one or more content items in a location of the information resource 210 that does not interrupt the user's experience of the information resource 210, thereby improving the human-computer interaction with the information resource 210 and increasing the effectiveness of the content item presented therein.

In some implementations, the location identification module 225 can include instructions to cause the client device 125 to identify a subset of the one or more elements 215A-N that together span the width of the viewport 300. In some implementations, the location identification module 225 can include instructions to cause the client device 125 to identify the widths and positions (e.g., x and y coordinate) of the one or more elements 215A-N. In some implementations, the location identification module 225 can include instructions to cause the client device 125 to identify the subset of the one or more elements 215A-N with the same position on one of the axes, based on the positions identified for each of the one or more elements 215A-N. In some implementations, the location identification module 225 can include instructions to cause the client device 125 to calculate a sum of the widths of the subset of the one or more elements 215A-N. In some implementations, the location identification module 225 can include instructions to cause the client device 125 to compare the sum of the widths to the width of the viewport 300. In some implementations, the location identification module 225 can include instructions to cause the client device 125 to determine that the subset of the one or more elements together span the width of the viewport 300. For example, as depicted in FIG. 3A, the location identification module 225 can include instructions to cause the client device 125 to identify the elements 305C and 305D as the subset of the one or more elements that together span the width of the viewport 300. The location identification module 225 can invoke the DOM function getBoundingClientRect( ) for the elements 215D and 215E to obtain the positions and width of the elements 215D and 215E. Using the positions and widths obtained, the location identification module 225 can include instructions to cause the client device 125 to determine that the elements 215D and 215E as two elements that together span the width of the viewport 300 and identify the bottom edge of the elements 215D and 215E as the fourth candidate content insertion location 305D.

The client device 125 can receive a content item for insertion at one of the one or more candidate content insertion locations 305 A-N of the information resource 210. In some implementations, the client device 125 can prefetch the content item from the data processing system 110. For example, prior to inserting the content item into the information resource 210 or determining where to insert the content item slot 315 the client device 125 can transmit a request for a content item to the data processing system 110 and subsequent can receive the content item for insertion from the data processing system 110. In this example, the request for the content item transmitted to the data processing system 110 may lack a size specification or a reference to a particular content item slot 315.

In some implementations, the location identification module 225 can include instructions to cause the client device 125 to determine whether the information resource 120 is suitable for dynamic content insertion. In some implementations, the location identification module 225 can include instructions to cause the client device 125 to identify a number of elements 215A-N that individually or together span the width of the viewport 300. In some implementations, the location identification module 225 can include instructions to cause the client device 125 to compare the number of elements 215A-N to a threshold number of elements for determining suitability of dynamic content insertion on the information resource 120. In some implementations, the location identification module 225 can include instructions to cause the client device 125 to identify size of the information resource 120. In some implementations, the location identification module 225 can include instructions to cause the client device 125 to compare the size of the information resource 120 to a threshold page size for determining suitability of dynamic content insertion on the information resource 120. For example, the height of the information resource 120 may span less than the height of the viewport 300 and the threshold height may be twice the height of the viewport 300. In this example, the location identification module 225 can include instructions to cause the client device 125 to compare the height of the information resource 120 to the threshold page height and determine that the information resource 120 is not suitable for dynamic content insertion. In some implementations, the client device 125 can transmit a request for third-party content, responsive to determining that the size of the information resource 120 is greater than the threshold page size or determining that the number of elements 215A-N that span the width of the viewport 300 is greater than the threshold number of elements. In some implementations, the client device 125 can receive the third-party content item, subsequent to transmitting the request for third-party content.

In some implementations, the client device can receive a conversion prediction value calculated by a remote device, such as the data processing system 110 or the content publisher computing device 120. The conversion prediction value can indicate the likelihood that the client device 125 will transmit addition requests on the content items presented with the information resource 210, and can be calculated by the remote device using a log listing the Internet activity of the client device 125 on content provided by the data processing system 110 or the content publisher computing device 120, such as the information resource 210. The conversion prediction value can be received with the information resource 210. In some implementations, the content insertion module 230 can include instructions to cause the client device 125 to compare the conversion prediction to a conversion likelihood threshold. In some implementations, the content insertion module 230 can include instructions to cause the client device 125 to transmit the request for the content item, responsive to determining that the conversion prediction value is above the conversion likelihood threshold.

The event detection module 230 can include instructions to cause the client device 125 to monitor for a scroll event on the information resource 210. The scroll event can have one or more scroll parameters. In some implementations, the scroll event can correspond to an input via a mouse connected to the client device 125 or a touch input on a touch-sensitive display (e.g., touchscreen) of the client device 125, among others. For example, the event detection module 230 can include instructions to cause the client device 125 to detect an "onTouch" event on the application 205 as the scroll event if the client device 125 includes a touch display. The scroll event can include, for example, an "onScroll," "onFling" or "onTouch" event handler or listener. The one or more scroll parameters can include scroll speed, cursor position, and scroll direction, among others. For example, the event detection module 230 can include instructions to cause the client device 125 to listen or handle scroll events. In some implementations, the event detection module 230 can include instructions to cause the client device 125 to execute or run other instructions, responsive to detecting the scroll event. For example, the event detection module 230 can include instructions to cause the client device 125 to invoke a function upon an "onScroll," "onFling," or "onTouch" event listener detecting the scroll event. In some implementations, the event detection module 230 can include instructions to cause the client device 125 to process the scroll event by throttling. For example, one the client device 125 receives one scroll event, the event detection module 230 can include instructions to cause the client device 125 not to process the scroll event until a predetermined timeframe has passed (e.g., 4 to 140 ms).

In conjunction with the event detection module 230, the location identification module 225 can include instructions to cause the client device 125 to identify, based on the one or more scroll parameters of the scroll event 310, a portion 300' of the information resource 210 to be displayed within the viewport 300 of the application 205 subsequent to processing the scroll event 310. The portion 300' can correspond to a portion of the information resource 210 that will be visible within the viewport 300 subsequent to processing the scroll event. In some implementations, the location identification module 225 can include instructions to cause the client device 125 to calculate the coordinates or range of the information resource 210 of the portion 300' relative to the top edge of the information resource 210 subsequent to processing the scroll event 310. For example, the location identification module 225 can include instructions to cause the client device 125 to identify the size of the viewport 300 using the JAVASCRIPT "clientHeight" and "clientWidth" properties. When the scroll event 310 is initially detected, the location identification module 225 can include instructions to cause the client device 125 to calculate the new pixel position of the information resource 210 subsequent to processing the scroll event 310 by invoking the "scrollTop" property for the information resource 210. Using the "scrollTop" and "clientHeight" properties, the location identification module 225 can include instructions to cause the client device 125 to identify the portion 300' as depicted in FIG. 3B of the information resource 210 will be in range of the viewport 300 subsequent to processing the scroll event 310.

In conjunction with the event detection module 230, the location identification module 225 can include instructions to cause the client device 125 to determine that one candidate content insertion location (e.g., the first candidate content insertion location 305A) is above the portion 300' and that another candidate insertion location (e.g., the second candidate content insertion location 305B) is within or below the portion 300'. For this example, when the scroll event 310 is initially detected, the location identification module 225 can include instructions to cause the client device 125 to calculate the new pixel coordinate positions for each of the elements 215A-N relative to the top edge of the information resource 210 subsequent to processing the scroll event 310 by invoking the "scrollTop" property for each of the elements 215A-N. The location identification module 225 can include instructions to cause the client device 125 to compare the new calculated positions of the elements 215A-N with the identified size of the viewport 300 to determine which of the candidate content insertion locations 305A-N will be within the range of the portion 300'. In the example depicted in FIG. 3B, based on the determined positions of each of the elements 215A-N, the location identification module 225 can include instructions to cause the client device 125 to determine that the first candidate content insertion location 305A will be located above the portion 300', the second candidate content insertion location 305B will be located within the portion 300', and the third candidate content insertion location 305C and the fourth candidate content insertion location 305D will be located below the portion 300' subsequent to processing the scroll event 310.

In some implementations, in conjunction with the event detection module 230, the location identification module 225 can include instructions to cause the client device 125 to determine, based on the scroll speed and subsequent to processing the scroll event, that the portion 300' of the information resource 210 corresponding to the one candidate content insertion location (e.g., the first candidate content insertion location 305A) is above the portion 300' of the information resource 210 is within the viewport 300 of the application 205. For example, the client device 125 may be a smartphone device and the scroll event may be an "onFling" event on the smartphone. In this example, when the "onFling" event is detected, the location identification module 225 can include instructions to cause the client device 125 to identify the scroll speed from one of one or more the scroll parameters (e.g., Android function getCurrVelocity( )) corresponding to the "onFling" event. The location identification module 225 can include instructions to cause the client device 125 to identify the portion 300' of the information resource 210 that will be visible through the viewport 300 subsequent to processing the scroll event 310 using the identified scroll speed and the initial portion of the information resource 210 visible through the viewport 300 prior to the scroll event 310.

The event detection module 230 can include instructions to cause the client device 125 to monitor one or more computing performance metrics for the client device 125. The computing performance metric can include, for example, central processing unit (CPU) processing time, CPU usage, network bandwidth usage, remaining battery lifetime, and computing system memory usage, among others. The computing performance metric can be measured or accessed, for example, by various function calls (e.g., JAVASCRIPT runtime) to obtain computing performance of the client device 125 and application programming interfaces with the application 205, among others.

In some implementations, the event detection module 230 can include instructions to cause the client device 125 to determine that at least one of the one or more computing performance metrics is above a performance threshold. The performance threshold can include, for example, maximum processing time, CPU usage percentage maximum, network bandwidth availability, battery lifetime threshold, and maximum memory usage, among others. For example, the event detection module 230 can include instructions to cause the client device 125 to identify the CPU usage percentage as 89% indicating that the client device 125 may suffer latency. The event detection module 230 can include instructions to cause the client device 125 to determine that the identified CPU usage percentage is above the CPU usage percentage threshold if the CPU usage percentage threshold is 70%. By comparing the CPU usage percentage to the CPU usage percentage threshold, the event detection module 230 can include instructions to cause the client device 125 to determine whether to transmit a request for a content item or withhold the insertion of the content item slot 315. In some implementations, the event detection module 230 can include instructions to cause the client device 125 to determine whether to transmit a request for a content item or withhold the insertion of the content item slot 315 responsive to comparing the computing performance metric to a performance thresholds. In the prior example, event detection module 230 can include instructions to cause the client device 125 to determine not to transmit the request for a content item, because the CPU usage percentage is at 89% above the CPU usage percentage threshold of 70%.

Figure 3C:
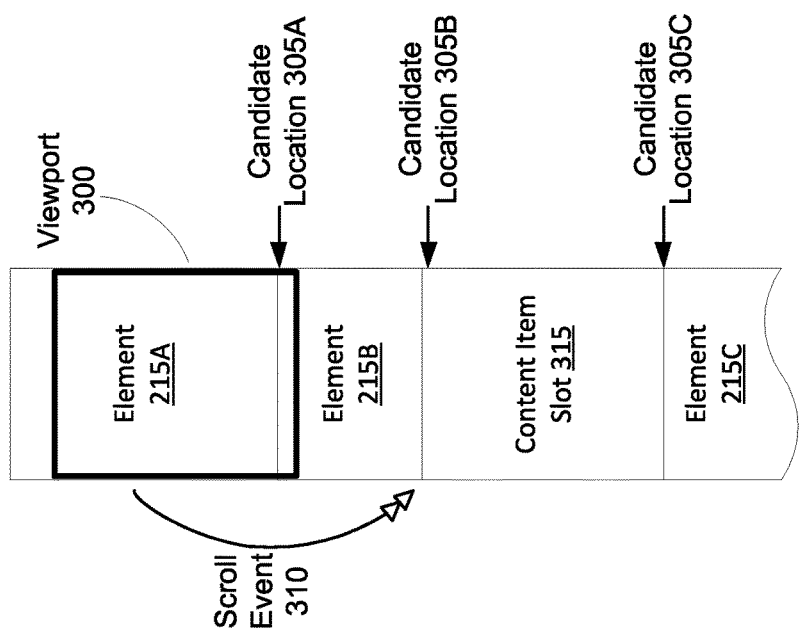

The content insertion module 235 can include instructions to cause the client device 125 to set, within the information resource 210, the content item slot 315 at one of the candidate content insertion location 305A-N, responsive to determining that the one of candidate content insertion location 305A-N is within or below the portion 300' and the other candidate content insertion locations 305A-N are above the portion 300'. For example, as depicted in FIG. 3C, the content insertion module 235 can include instructions to cause the client device 125 to set the content item slot 315 at the second candidate content insertion location 305B, responsive to determining that the first candidate content insertion location 305A is above the portion 300 and that the second candidate insertion location 305B is within the portion 300'. Although not depicted in FIG. 3C, the content insertion module 235 can include instructions to cause the client device 125 to set the content item slot 315 at the third candidate content insertion location 305C and the fourth candidate content insertion location 305D, responsive to determining that the third candidate content insertion location 305C and the fourth candidate content insertion location 305D below the portion 300'. In some implementations, the content insertion module 235 can include instructions to cause the client device 125 to instantiate a new element or a plurality of new elements into the information resource 210 at the identified candidate content insertion location 305A-N. For example, the content insertion module 235 can include instructions to cause the client device 125 to a new HTML element, a new DOM tree element, or a new CSS element, among others.

In some implementations, the content insertion module 235 can include instructions to cause the client device 125 to set a size of the content item slot 315. In some implementations, the content insertion module 235 can include instructions to cause the client device 125 to identify the size (e.g., height and width) of the viewport 300 of the application 205. In some implementations, the content insertion module 235 can include instructions to cause the client device 125 to set the size of the content item slot 315 based on the viewport 300 of the application 205. In some implementations, the content insertion module 235 can include instructions to cause the client device 125 to set the height of the content item slot 315 to the height of the viewport 300 and the width of the content item slot 315 to the width of the viewport 300. For example, the content insertion module 235 can include instructions to cause the client device 125 to identify the size of the viewport 300 of the application 205 by invoking "clientHeight" and "clientWidth" or "Window.innerHeight" and "Window.innerWidth." Using the identified size of the viewport 300, the content insertion module 235 can include instructions to cause the client device 125 to set a width of the content item slot 315 to 70-100% of the identified width of the viewport 300. In some implementations, the client device 125 can transmit the request for the content item including the identified size of the viewport 300. In some implementations, the client device 125 can receive the content item having a size based on the size of the viewport 300. For example, as depicted in FIG. 3D, the client device 125 can receive the content item having a height equal to the height of the viewport 300 and having a width equal to the width of the viewport 300.

In some implementations, the client device 125 can transmit the request for the content item, responsive to inserting the content item slot 315 on the information resource 210. For example, as depicted in FIG. 3C, after instantiating a new element and inserting the new element as the content item slot 315 in the information resource 210, the client device 125 can transmit the request for the content item for insertion into the content item slot 315. The client device 125 can subsequently receive the content item to insert into the content item slot 315. It should be appreciated that transmitting the request for the content item subsequent to identifying which of the candidate content insertion locations 305A-N to dynamically insert the content item reduces the number of requests transmitted from the client device 125 and number of content items received from the data processing system 110 via the network 105, thereby freeing up the network bandwidth and computing resources at the client device 125.

The content insertion module 235 can include instructions to cause the client device 125 to insert the content item at the inserted content item slot 315 for display at the identified candidate content insertion location 305A-N on the information resource 210. In some implementations, the content insertion module 235 can include instructions to cause the client device 125 to embed the content item as a new element into the inserted content item slot 315. For example, the content insertion module 235 can include instructions to cause to instantiate the content item slot 315 and then, once the content item is received, insert, embed, or otherwise append the content item into the content item slot 315 using the DOM function "appendChild( )." In some implementations, the content insertion module 230 can include instructions to cause the client device 125 to insert the content item slot 315, responsive to determining that the conversion prediction value is above the conversion likelihood threshold.

In some implementations, in conjunction with the event detection module 230, the content insertion module 235 can include instructions to cause the client device 125 to modify the content item received from the data processing system 110 based on the size of the content item slot to fit the content item within the content item slot 315. In some implementations, in conjunction with the event detection module 230, the content insertion module 235 can include instructions to cause the client device 125 to modify the size of the content item to substantially match the size of the content item slot 315 to fit the content item within the content item slot 315. In some implementations, in conjunction with the event detection module 230, the content insertion module 235 can include instructions to cause the client device 125 to skew the content item to substantially the match size of the content item slot 315 (e.g., 80-100%). For example, the content insertion module 235 can include instructions to cause the client device 125 to skew the image to 1080 by 1920 pixel size to fit the size of the content item slot 315 if the content item includes an image received from the data processing system 110 is 1080 by 1800 pixels and the size of the content item slot 315 is 1080 by 1920 pixels.

In some implementations, in conjunction with the event detection module 230 and the location identification module 225, the content insertion module 235 can include instructions to cause the client device 125 to insert an action item (e.g., button or link) to interact with the content item at a location on the content item that corresponds to a range of coordinates of the touch-sensitive display on which the input actions were performed when the content item is displayed within the third-party content slot. In some implementations, the event detection module 230 can include instructions to cause the client device 125 to receive a plurality of input actions performed on a touch-sensitive display (e.g., touchscreen) of the client device 125. In some implementations, the location identification module 225 can include instructions to cause the client device 125 to determine, for the plurality input actions, locations on the touchscreen at which the input action was performed. For example, the client device 125 may be a smartphone and can maintain a log of input actions from event listening and handling. The log of input actions can include the positions (e.g., x and y pixel coordinates) of the input action on the touch-sensitive display of the client device 125. In some implementations, the location identification module 225 can include instructions to cause the client device 125 to determine, based on the locations on the touch-sensitive display at which the input actions were performed, a range of coordinates of the touch-sensitive display on which the input actions were performed. For example, using the log of input actions, the location identification module 225 can include instructions to cause the client device 125 to apply to calculate the mean or average coordinate and the variance of the input action coordinates. Based on the mean coordinate and the variance of input action coordinates, the location identification module 225 can include instructions to cause the client device 125 to set the range of coordinates of the touch-sensitive display around the mean coordinate by the calculated variance. In some implementations, the content insertion module 235 can include instructions to cause the client device 125 to insert the action item based on the identified range of coordinates. For example, if viewport 300 is 1080 pixels in the x-axis and the range of coordinates on the x-axis is between 0 to 530 pixels generally toward the left side of the touch-sensitive display on the client device 125, the content insertion module 235 can include instructions to cause the client device 125 to insert the action item with an x-axis coordinate position of 150 pixels.

In some implementations, the content insertion module 235 can include instructions to cause the client device 125 to interrupt the processing of the scroll event 310, responsive to determining that another portion of the information resource 210 below the content item slot 315 will be displayed subsequent processing the scroll event. In some implementations, the location identification module 225 can include instructions to cause the client device 125 to determine that the content item slot 315 is within the range of the viewport 300. In some implementations, the location identification module 225 can include instructions to cause the client device 125 to determine that processing the scroll event would display another portion of the information resource 210 below the content item slot 315 of the information resource. For example, as depicted in FIG. 3D, the location identification module 225 can include instruction to cause the client device 125 to determine content item slot 315 fully spans the size of the viewport 300. The event detection module 230 can include instructions to cause the client device 125 to then identify that the scroll direction is downward and the scroll amount from the one or more scroll parameters of the scroll event 310. In this example, the location identification module 225 can include instructions to cause the client device 125 to determine that the portion that will come into the range of the viewport 300 will be below the content item slot 315 based on the scroll parameters identified. The content insertion module 235 can include instructions to cause the client device 125 to subtract the scroll amount from the one or more scroll parameters when processing the scroll event 310. In this example, visually, the portion of the information resource 210 within the viewport 300 is prevented from down past the content item slot 315. In some implementations, the content insertion module 235 can include instructions to cause the client device 125 to adjust the scroll speed of the scroll event 310, when the content item slot 315 is within range of the viewport 300. For example, rather than subtracting the entire scroll amount when processing the scroll event 310, the content insertion module 235 can include instructions to cause the client device 125 to subtract a fraction (e.g., 25-75%) of the scroll amount when processing the scroll event 310.

In some implementations, the content insertion module 235 can include instructions to cause the client device 125 to allow the processing of the scroll event 310, responsive to detecting a click event on the content item inserted in the content item slot 315. In some implementations, the content insertion module 235 can include instructions to cause the client device 125 to detect the click event on the action item inserted in the content item. For example, once the client device 125 detects a click event on a button on the content item inserted in the content item slot 315, the content insertion module 235 can include instructions to cause the client device 125 to resume the processing of another scroll event, thereby enabling the portion of the information resource 210 within the viewport 300 to move down past the content item slot 315.

Referring again to FIG. 3A-3D in the context of the dynamic content insertion system 200 described in conjunction with FIG. 2, beginning with FIG. 3A, the client device 125 can load the information resource 210 for display on the application 205, a portion of which is visible through the viewport 300. The information resource 210 can include five elements 215A-E. The location identification module 225 can include instructions to cause the client device 125 to identify the top or bottom edges of the five elements 215A-E that span the width of the viewport 300. Based on the identified edges, the location identification module 225 can include instructions to cause the client device 125 to locate the one or more candidate content insertion locations 305A-E on the information resource 210 for inserting the content item slot 315.

Moving onto FIG. 3B, FIG. 3B depicts the information resource 210 at a scroll position lower than that of FIG. 3A. In FIG. 3B, the event detection module 225 can include instructions to cause the client device 125 to monitor and detect the scroll event 310 on the information resource 210. The scroll event 310 can include the one or more scroll parameters, such as scroll speed, scroll amount, and scroll direction, among others. The location identification module 230 can include instructions to cause the client device 125 to determine identify the portion 300' of the information resource 210 that will be display within the viewport 300 of the application 205 subsequent to processing the scroll event. Using the identified portion 300', the location identification module 230 can include instructions to cause the client device 125 to determine that the first candidate content insertion location 305A will be above the portion 300', the second candidate content insertion location 305B will be within the portion 300', and the third candidate content insertion location 305C and the fourth candidate content insertion location 305D will be below the portion 300'.

Moving onto FIG. 3C, FIG. 3C depicts the information resource 210 at the same scroll position as that in FIG. 3B. In FIG. 3C, based on the determining which of the candidate content insertion locations 305A-E will be within the viewport 300 subsequent to processing the scroll event, the content insertion module 235 can include instructions to cause the client device 125 to insert the content item slot 315 at the second candidate content insertion location 305B while processing the scroll event. The content insertion module 235 can include instructions to cause the client device 125 to set the size of the content item slot 315 to match the size of the viewport 300. In some implementations, the content insertion module 235 can include instruction to cause the client device 125 to also insert the content item pre-fetched from the data processing system 110 into the content item slot 315. In some implementations, the content insertion module 235 can include instruction to cause the client device 125 to transmit a request for a content item to the data processing system 110 and insert the received content item once received.

Moving onto FIG. 3D, FIG. 3D depicts the information resource 210 at a scroll position lower than that of FIGS. 3B and 3C. In FIG. 3D, the content item slot 315 fully spans the height and width of the viewport 300, thereby facilitating a fully immersive experience of the content item inserted in the content item slot 315. In some implementations, the content insertion module 230 can include instructions to cause the client device 125 to adjust the scroll speed while scrolling down from the scroll position depicted in FIG. 3C to the scroll position depicted in FIG. 3D, as the content item slot 315 comes within range of the viewport 300. In some implementations, the content insertion module 230 can include instructions to cause the client device 125 to stop the scroll position, so that information resource 210 is not scrollable past the bottom edge of the content item slot 315.

The above described functionality of the dynamic content insertion script 220 can be repeated numerous times. For example, at FIG. 3D, the event detection module 230 can include instructions to cause the client device 125 to detect another scroll event. Responsive to detecting the other scroll event, the location identification module 225 can include instructions to cause the client device 125 to locate candidate content insertion locations, such as the third candidate content insertion location 305C and the fourth candidate content insertion location 305D. The content insertion module 235 can include instructions to cause the client device 125 to also insert another content item slot at the third candidate content insertion location 305C, the fourth candidate content insertion location 305D, or another candidate content insertion location.

Figure 4:
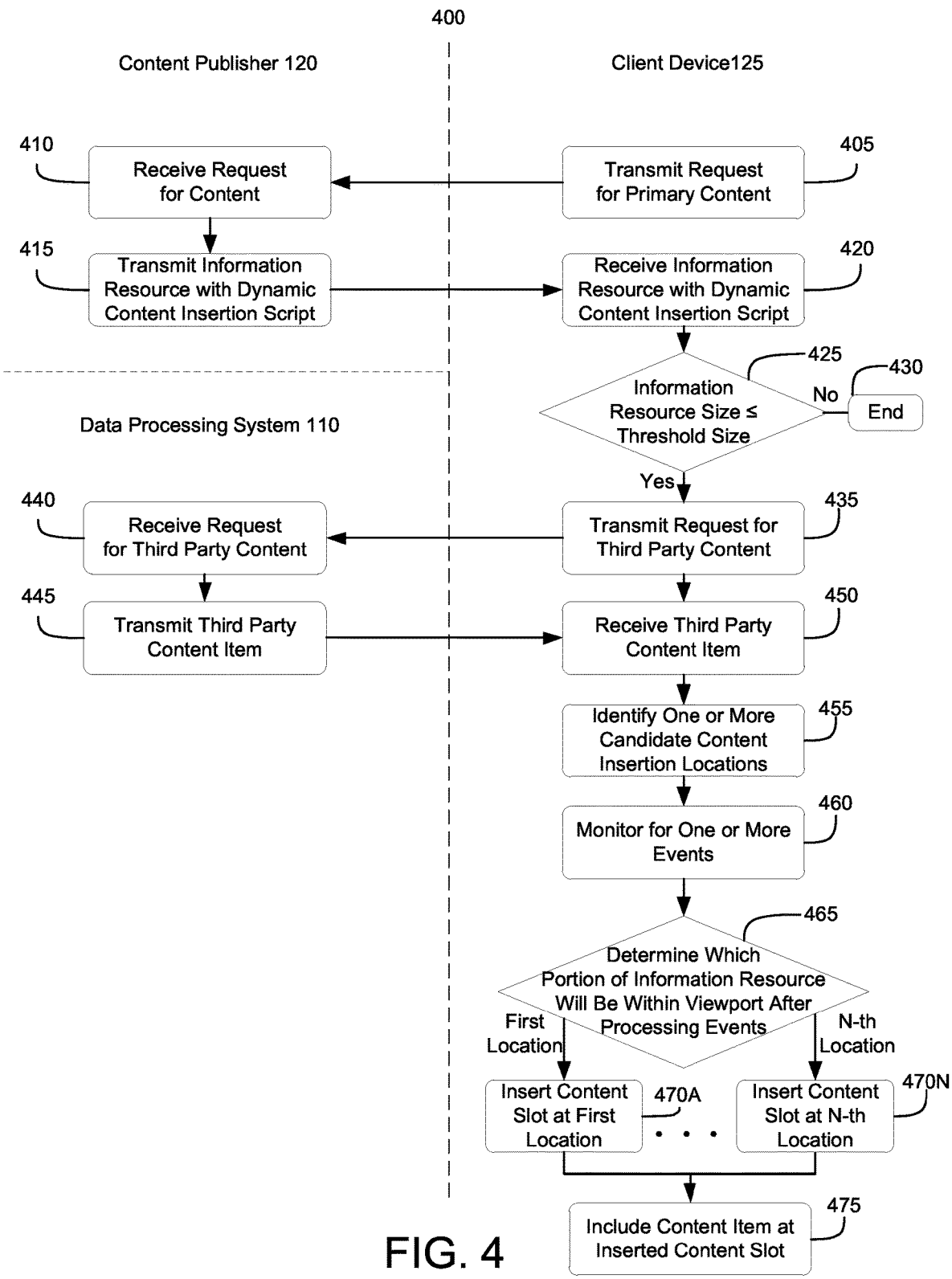
FIG. 4 is a flow diagram depicting a method of dynamically inserting content on an information resource, according to an illustrative implementation.
Figure 5:
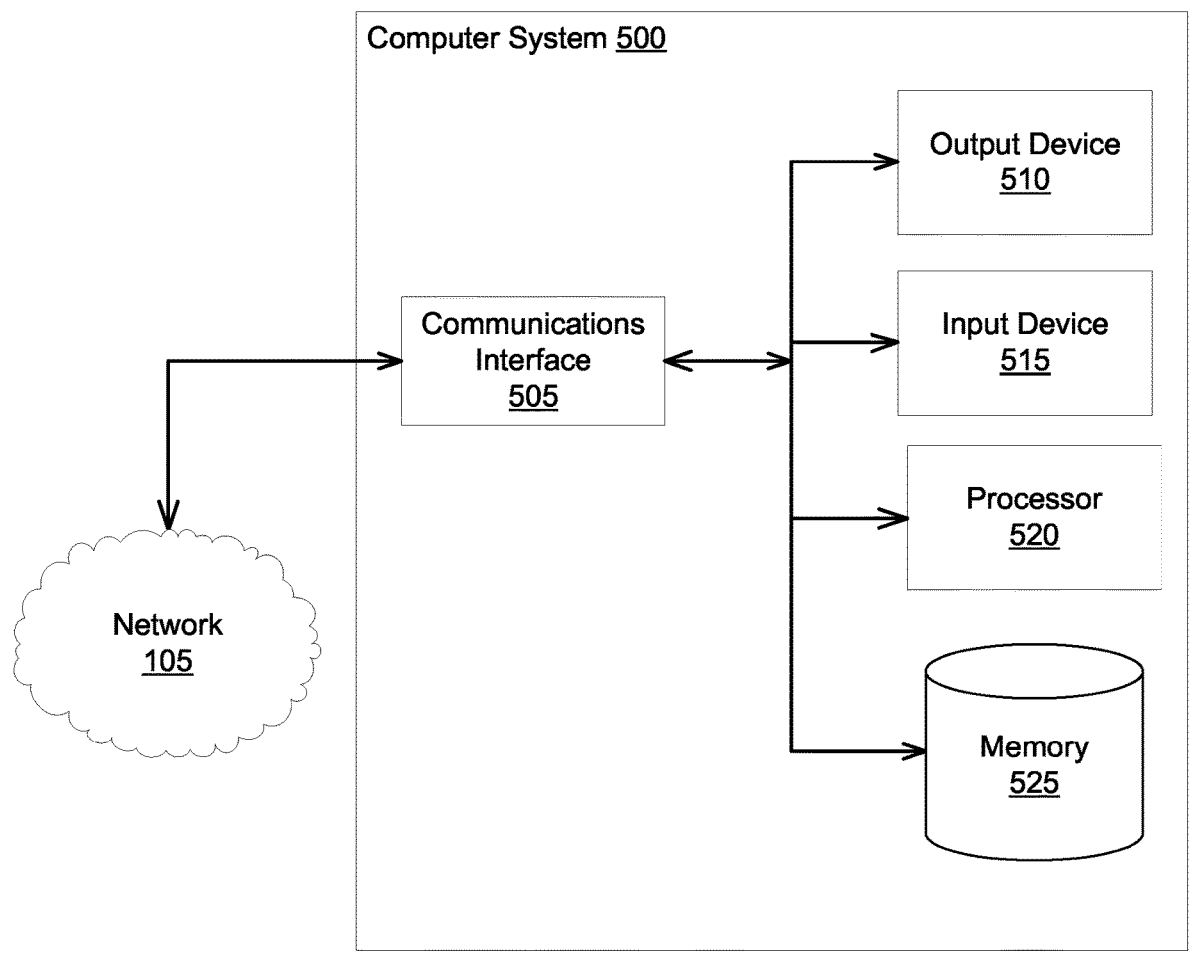
FIG. 5 is a block diagram illustrating a general architecture for a computer system that may be employed to implement elements of the systems and methods described and illustrated herein, according to an illustrative implementation.

Referring to FIG. 4, FIG. 4 is a flow diagram depicting a method 400 of attributing a scroll event on an application. The functionality described herein with respect to method 400 can be performed or otherwise executed by the data processing system 110 or client device 125 as shown in FIG. 1, the content display management system 200 as shown in FIG. 2, or a computing device as shown in FIG. 5, or any combination thereof. For example, FIG. 4 depicts the functionalities of the method 400 distributed between the data processing system 110, content publisher computing device 120, and the client device 125. In brief overview, the client device can transmit a request for primary content (BLOCK 405). The content publisher computing device can receive the request for primary content (BLOCK 410). The content publisher computing device can transmit an information resource with the dynamic content insertion script (BLOCK 415). The client device can receive the information resource with the dynamic content insertion script (BLOCK 420). The client device can determine whether the size of information resource is greater than or equal to the threshold size (BLOCK 425). If the size of the information resource is less than the threshold size, the client device can end the execution of the dynamic content insertion script (BLOCK 430). If the length of information resource is greater than or equal to the threshold size is greater than the threshold size, the client device can transmit a request for third party content to the data processing system (BLOCK 435). The data processing system can receive the request for third party content (BLOCK 440). The data processing system can transmit the third party content item to the client device (BLOCK 445). The client device can receive the third party content item (BLOCK 450). The client device can identify one or more candidate content insertion locations (BLOCK 455). The client device can monitor for one or more events (BLOCK 460). The client device can determine which portion of the information resource will be within viewport subsequent to processing the one or more events (BLOCK 465). The client device can insert content item slot at one of the one or more candidate content insertion locations (BLOCK 470A-N). The client device can include the third party content item at the inserted content item slot (BLOCK 475).

In further detail, the client device can transmit a request for primary content (BLOCK 405). The request for primary content can include an address or identifier for the primary content (e.g., information resource). In some implementations, the client device can transmit a request for an information resource to the content publisher computing device or the data processing system. The request for the information resource can include an address or identifier for the information resource. For example, the request for content can include Uniform Resource Locator (URL) referring to a specific resource such as a webpage (e.g., "www.example_publisher.com/index.html"). In some implementations, the client device can, subsequent to transmitting the request for the information resource, receive the information resource. In some implementations, the client device can receive the dynamic content insertion script along with the information resource. The application executing on the client device can process and run code included in the information resource and the dynamic content insertion script included or otherwise embedded in the information resource.

The content publisher computing device can receive the request for primary content (BLOCK 410). The content publisher computing device can identify the address or identifier for the information resource included in the request for content. The content publisher computing device access the database and select the information resource identified by the address or identifier. In some implementations, the content publisher computing device can receive a request for an information resource that can include an indicator indicating a request for a dynamic content insertion script. For example, the request for the information resource can include a header including an indicator specifying the data processing system to send the dynamic content insertion script along with the information resource to the client device. In some implementations, the information resource can include the dynamic content insertion script inserted in the script for the information resource. In some implementations, the information resource can include a script for retrieving the dynamic content insertion script for insertion into the information resource.

In some implementations, the content publisher computing device can transmit or forward the information resource identified by the address or identifier to the data processing system. For example, the data processing system can receive from a client device a request for an information resource. The request may include an address referring to one of the content provider computing devices. In this example, the data processing system can forward the request for the information resource to the respective content publisher computing device. Upon receiving the information resource from the respective content publisher computing device, the data processing system can forward the content document to the client device that made the original request, along with the dynamic content insertion script.

In some implementations, the data processing system can receive a request for the dynamic content insertion script from the content publisher computing device for insertion into an information resource to be provided to the client device. The data processing system can, responsive to receiving the request for the dynamic content insertion script from the content publisher computing device, transmit the dynamic content insertion script to the content publisher computing device for insertion or embedding the dynamic content insertion script into the information resource. In some implementations, the script provider module can receive a request for a up-to-date version of the dynamic content insertion script. For example, the data processing system can periodically receive a request for the dynamic content insertion script from the content publisher computing device, and in response transmit the most up-to-date version of the dynamic content insertion script. In turn, the content publisher computing device can insert or otherwise embed the updated dynamic content insertion script into one or more information resources. In this example, when the content publisher computing device receives a request for an information resource from the client device, the content publisher computing device transmit the respective information resource along with the dynamic content insertion script to the client device. In some implementations, the data processing system can receive the request for the dynamic insertion script from the client device, along with the request for the information resource. In some implementations, the data processing system, in conjunction with the other modules of the data processing system, can transmit the information resource with the dynamic insertion script embedded to the client device.

In some implementations, the data processing system can determine whether the information resource of the content publisher computing device is suitable for insertion of the dynamic content insertion script. In some implementations, the data processing system can identify the information resource either already received by the client device or to be sent to the client device. In some implementations, the data processing system can identify a size of the information resource. The size of the information resource can include the height and width of the information resource measured in pixel, inch, or metric units. In some implementations, the data processing system can compare the length of the information resource to a threshold size. In some implementations, the data processing system, responsive to determining that the size of the information resource is greater or equal to than the threshold size, can determine that the information resource of the content publisher computing device is suitable for insertion of the dynamic content insertion script and transmit the dynamic content insertion script to the content publisher computing device. In some implementations, the data processing system, responsive to determining that the size of the information resource is less than the threshold size, can determining that the information resource of the content publisher computing device is unsuitable for insertion of the dynamic content insertion script. In some implementations, the data processing system can, responsive to determining that the information resource of the content publisher computing device is unsuitable for insertion of the dynamic content insertion script, transmit an indicator indicating that the information resource of the content publisher computing device is unsuitable to the content publisher computing device.

The content publisher computing device can transmit an information resource with the dynamic content insertion script (BLOCK 415). The client device can receive the information resource with the dynamic content insertion script (BLOCK 420). The dynamic content insertion script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JAVASCRIPT, among others. The computer-executable instructions can be executed by an application of the client device, for example, the application that caused the client device to transmit the request for content received by the data processing system. The application can include, for example, an Internet browser, mobile application, or any other computer program capable of reading and executing the computer-executable instructions. In brief overview, the computer-executable instructions, when executed by a processor of the client device, can cause an application of the client device to: (1) identify a first candidate content insertion location and a second candidate content insertion location for insertion of the third-party content item based on locations of one or more elements on the information resource; (2) monitor for a scroll event on the information resource, the scroll event having one or more parameters; (3) identify, based on the one or more parameters of the scroll event, a first portion of the information resource to be displayed within the viewport of the application subsequent to processing the event; (4) determine that the first candidate content insertion location is above the first portion and that the second candidate insertion location is within or below the viewport; (5) set, within the information resource, a third-party content slot at the second candidate content insertion location responsive to determining that the first candidate content insertion location is above the first portion and that the second candidate insertion location is within or below the viewport; and (6) insert, at the third-party content slot, the third-party content item for display at the second candidate content insertion location on the information resource.

The dynamic content insertion system can be run or otherwise be executed by one or more processors of a client device or any other computing device. The dynamic content insertion system can include an application, an information resource, and an dynamic content insertion script. The application can include, for example, an Internet browser, mobile application, or any other computer program capable of executing or otherwise invoking computer-executable instructions, such as the computer-executable instructions included in the information resource, one or more elements, and dynamic content insertion script. The information resource can include one or more one or more elements. The one or more elements can include, for example, Hypertext Markup Language (HTML) elements, Document Object Model (DOM) tree elements, such as a form, link, or image element, and Cascading Style Sheets (CSS) elements. The information resource can be received by the application along with the dynamic content insertion script from the content publisher computing device or the one or more modules of the data processing system.

The client device can determine whether the size of information resource is greater than or equal to the threshold size (BLOCK 425). In some implementations, the client device can determine whether the information resource is suitable for dynamic content insertion. In some implementations, the client device can identify a number of elements that individually or together span the width of the viewport. In some implementations, the client device can compare the number of elements to a threshold number of elements for determining suitability of dynamic content insertion on the information resource. In some implementations, the client device can identify size of the information resource. In some implementations, the client device can compare the size of the information resource to a threshold page size for determining suitability of dynamic content insertion on the information resource. For example, the height of the information resource may span less than the height of the viewport and the threshold height may be twice the height of the viewport. In this example, the client device can compare the height of the information resource to the threshold page height and determine that the information resource is not suitable for dynamic content insertion.

If the size of the information resource is less than the threshold size, the client device can end the execution of the dynamic content insertion script (BLOCK 430). In some implementations, the client device can end the execution of the dynamic content insertion script, responsive to determining that the number of elements that individually or together span the width of the viewport is below the threshold number of elements.

If the length of information resource is greater than or equal to the threshold size is greater than the threshold size, the client device can transmit a request for third party content to the data processing system (BLOCK 435). The client device can receive a content item for insertion at one of the one or more candidate content insertion locations of the information resource. In some implementations, the client device can pre-fetch the content item from the data processing system. For example, prior to inserting the content item into the information resource or determining where to insert the content item slot the client device can transmit a request for a content item to the data processing system and subsequent can receive the content item for insertion from the data processing system. In this example, the request for the content item transmitted to the data processing system 110 may lack a size specification or a reference to a particular content item slot 315. In some implementations, the client device can transmit a request for third-party content, responsive to determining that the size of the information resource is greater than the threshold page size or determining that the number of elements that span the width of the viewport is greater than the threshold number of elements. In some implementations, the client device can receive the third-party content item, subsequent to transmitting the request for third-party content.

In some implementations, the client device can receive a conversion prediction value calculated by a remote device, such as the data processing system or the content publisher computing device. The conversion prediction value can indicate the likelihood that the client device will transmit addition requests on the content items presented with the information resource, and can be calculated by the remote device using a log listing the Internet activity of the client device on content provided by the data processing system or the content publisher computing device, such as the information resource. The conversion prediction value can be received with the information resource. In some implementations, the client device can compare the conversion prediction to a conversion likelihood threshold. In some implementations, the client device can transmit the request for the content item, responsive to determining that the conversion prediction value is above the conversion likelihood threshold.

The data processing system can receive the request for third-party content (BLOCK 440). The request for third-party content can include a request for a content item. The request for content can include an address or identifier for the content item. For example, the request for content can include Uniform Resource Locator (URL) referring to a specific resource such as a third-party content item (e.g., "www.example_third_party.com/ad_123579.html"). The request for content can correspond to a content item slot on an information resource received by the client device. The host name of the URL for the information resource may differ from the host name of the URL for the content item. For example, the URL for the information resource can be "www.example_publisher.com/index.html" but the URL for the content item can be "www.example_thirdparty.com/content_item_271828.html." In some implementations, the data processing system can identify a type of request based on the URL. The type of request can include a request for a content item or a request for an information resource. The data processing system can transmit the third party content item to the client device (BLOCK 445). The client device can receive the third party content item (BLOCK 450).

The client device can identify one or more candidate content insertion locations (BLOCK 455). The client device can identify one or more candidate content insertion locations, for insertion of a third-party content item based on the one or more elements of the information resource. In some implementations, the client device can identify one or more elements that span a predetermined percentage of the width of the viewport. In some implementations, the client device can identify the one or more elements based on a position, alignment, or justification (e.g., left, right, or center justification) of the respective element. For example, the one or more elements can span 66% to 100% of the width of the viewport. In some implementations, the client device can identify one or more elements located above or below the range of the viewport. In some implementations, client device can identify the boundaries, edges, or coordinates of the identified one or more elements as the one or more candidate content insertion locations. By identifying the edges of the one or more elements, the client device can later insert one or more content items in a location of the information resource that does not interrupt the user's experience of the information resource, thereby improving the human-computer interaction with the information resource and increasing the effectiveness of the content item presented therein.

In some implementations, the client device can identify a subset of the one or more elements that together span the width of the viewport. In some implementations, the client device can identify the widths and positions (e.g., x and y coordinate) of the one or more elements. In some implementations, the client device can identify the subset of the one or more elements with the same position on one of the axes, based on the positions identified for each of the one or more elements. In some implementations, the client device can calculate a sum of the widths of the subset of the one or more elements. In some implementations, the client device can compare the sum of the widths to the width of the viewport. In some implementations, the client device can determine that the subset of the one or more elements together span the width of the viewport. For example, the client device can invoke the DOM function getBoundingClientRect( ) to obtain the positions and width of some of the elements. Using the positions and widths obtained, the client device can determine that the elements as a plurality of elements that together span the width of the viewport and identify the bottom edge of the plurality of elements as another candidate content insertion location.

The client device can monitor for one or more events (BLOCK 460). The client device can monitor for a scroll event on the information resource. The scroll event can have one or more scroll parameters. In some implementations, the scroll event can correspond to an input via a mouse connected to the client device or a touch input on a touch-sensitive display (e.g., touchscreen) of the client device, among others. For example, if the client device includes a touch display, the client device can detect an "onTouch" event on the application as the scroll event. The scroll event can include, for example, an "onScroll," "onFling" or "onTouch" event handler or listener. The one or more scroll parameters can include scroll speed, cursor position, and scroll direction, among others. For example, the client device can listen or handle scroll events. In some implementations, the client device can execute or run other instructions, responsive to detecting the scroll event. For example, the client device can invoke a function upon an "onScroll." "onFling." or "onTouch" event listener detecting the scroll event. In some implementations, the client device can process the scroll event by throttling. For example, one the client device receives one scroll event, the client device may not to process the scroll event until a predetermined timeframe has passed (e.g., 4 to 140 ms).

The client device can determine which portion of the information resource will be within viewport subsequent to processing the one or more events (BLOCK 465). The client device can identify, based on the one or more scroll parameters of the scroll event, a portion of the information resource to be displayed within the viewport of the application subsequent to processing the scroll event. The portion can correspond to a portion of the information resource that will be visible within the viewport subsequent to processing the scroll event. In some implementations, the client device can calculate the coordinates or range of the information resource of the portion relative to the top edge of the information resource subsequent to processing the scroll event. For example, the client device can identify the size of the viewport using the JAVASCRIPT "clientHeight" and "clientWidth" properties. When the scroll event is initially detected, the client device can calculate the new pixel position of the information resource subsequent to processing the scroll event by invoking the "scrollTop" property for the information resource. Using the "scrollTop" and "clientHeight" properties, the client device can identify the portion of the information resource will be in range of the viewport subsequent to processing the scroll event.

The client device can determine that which candidate content insertion locations are above the portion and which other candidate insertion locations are within or below the portion. For this example, when the scroll event is initially detected, the client device can calculate the new pixel coordinate positions for each of the elements relative to the top edge of the information resource subsequent to processing the scroll event by invoking the "scrollTop" property for each of the elements. The client device can compare the new calculated positions of the elements with the identified size of the viewport to determine which of the candidate content insertion locations will be within the range of the portion.

In some implementations, the client device can determine, based on the scroll speed and subsequent to processing the scroll event, that the portion of the information resource corresponding to the one candidate content insertion location is above the portion of the information resource is within the viewport of the application. For example, the client device may be a smartphone device and the scroll event may be an "onFling" event on the smartphone. In this example, when the "onFling" event is detected, the client device can identify the scroll speed from one of one or more the scroll parameters (e.g., Android function getCurrVelocity( )) corresponding to the "onFling" event. The client device can identify the portion of the information resource that will be visible through the viewport subsequent to processing the scroll event using the identified scroll speed and the initial portion of the information resource visible through the viewport prior to the scroll event.

The client device can monitor one or more computing performance metrics for the client device. The computing performance metric can include, for example, central processing unit (CPU) processing time, CPU usage, network bandwidth usage, remaining battery lifetime, and computing system memory usage, among others. The computing performance metric can be measured or accessed, for example, by various function calls (e.g., JAVASCRIPT runtime) to obtain computing performance of the client device and application programming interfaces with the application, among others.

In some implementations, the client device can determine that at least one of the one or more computing performance metrics is above a performance threshold. The performance threshold can include, for example, maximum processing time, CPU usage percentage maximum, network bandwidth availability, battery lifetime threshold, and maximum memory usage, among others. For example, the client device can identify the CPU usage percentage as 89% indicating that the client device may suffer latency. If the CPU usage percentage threshold is 70%, the client device can determine that the identified CPU usage percentage is above the CPU usage percentage threshold. By comparing the CPU usage percentage to the CPU usage percentage threshold, the client device can determine whether to transmit a request for a content item or withhold the insertion of the content item slot. In some implementations, the client device can determine whether to transmit a request for a content item or withhold the insertion of the content item slot responsive to comparing the computing performance metric to a performance thresholds. In the prior example, client device can determine not to transmit the request for a content item, because the CPU usage percentage is at 89% above the CPU usage percentage threshold of 70%.

The client device can insert content item slot at one of the one or more candidate content insertion locations (BLOCK 470A-N). The client device can set, within the information resource, the content item slot at one of the candidate content insertion location, responsive to determining that the one of candidate content insertion location is within or below the portion and the other candidate content insertion locations are above the portion. In some implementations, the client device can instantiate a new element or a plurality of new elements into the information resource at the identified candidate content insertion location. For example, the client device can a new HTML element, a new DOM tree element, or a new CSS element, among others.

In some implementations, the client device can set a size of the content item slot. In some implementations, the client device can identify the size (e.g., height and width) of the viewport of the application. In some implementations, the client device can set the size of the content item slot based on the viewport of the application. In some implementations, the client device can set the height of the content item slot to the height of the viewport and the width of the content item slot to the width of the viewport. For example, the client device can identify the size of the viewport of the application by invoking "clientHeight" and "clientWidth" or "Window.innerHeight" and "Window.innerWidth." Using the identified size of the viewport, the client device can set a width of the content item slot to 70-100% of the identified width of the viewport. In some implementations, the client device can transmit the request for the content item including the identified size of the viewport. In some implementations, the client device can receive the content item having a size based on the size of the viewport. For example, the client device can receive the content item having a height equal to the height of the viewport and having a width equal to the width of the viewport.

In some implementations, the client device can transmit the request for the content item, responsive to inserting the content item slot on the information resource. For example, after instantiating a new element and inserting the new element as the content item slot in the information resource, the client device can transmit the request for the content item for insertion into the content item slot. The client device can subsequently receive the content item to insert into the content item slot. It should be appreciated that transmitting the request for the content item subsequent to identifying which of the candidate content insertion locations dynamically insert the content item reduces the number of requests transmitted from the client device and number of content items received from the data processing system via the network 105, thereby freeing up the network bandwidth and computing resources at the client device.

The client device can include the third party content item at the inserted content item slot (BLOCK 475). The client device can insert the content item at the inserted content item slot for display at the identified candidate content insertion location on the information resource. In some implementations, the client device can embed the content item as a new element into the inserted content item slot. For example, the data processing system can include instructions to cause to instantiate the content item slot and then, once the content item is received, insert, embed, or otherwise append the content item into the content item slot using the DOM function "appendChild( )." In some implementations, the client device can insert the content item slot, responsive to determining that the conversion prediction value is above the conversion likelihood threshold.

In some implementations, the client device can modify the content item received from the data processing system based on the size of the content item slot to fit the content item within the content item slot. In some implementations, the client device can modify the size of the content item to substantially match the size of the content item slot to fit the content item within the content item slot. In some implementations, the client device can skew the content item to substantially the match size of the content item slot (e.g., 80-100%). For example, if the content item includes an image received from the data processing system is 1080 by 1800 pixels and the size of the content item slot is 1080 by 1920 pixels, the client device can skew the image to 1080 by 1920 pixel size to fit the size of the content item slot.

In some implementations, the client device can insert an action item (e.g., button or link) to interact with the content item at a location on the content item that corresponds to a range of coordinates of the touch-sensitive display on which the input actions were performed when the content item is displayed within the third-party content slot. In some implementations, the client device can receive a plurality of input actions performed on a touch-sensitive display (e.g., touchscreen) of the client device. In some implementations, the client device can determine, for the plurality input actions, locations on the touchscreen at which the input action was performed. For example, the client device may be a smartphone and can maintain a log of input actions from event listening and handling. The log of input actions can include the positions (e.g., x and y pixel coordinates) of the input action on the touch-sensitive display of the client device. In some implementations, the client device can determine, based on the locations on the touch-sensitive display at which the input actions were performed, a range of coordinates of the touch-sensitive display on which the input actions were performed. For example, using the log of input actions, the client device can apply to calculate the mean or average coordinate and the variance of the input action coordinates. Based on the mean coordinate and the variance of input action coordinates, the client device can set the range of coordinates of the touch-sensitive display around the mean coordinate by the calculated variance. In some implementations, the client device can insert the action item based on the identified range of coordinates. For example, if viewport is 1080 pixels in the x-axis and the range of coordinates on the x-axis is between 0 to 530 pixels generally toward the left side of the touch-sensitive display on the client device, the client device can insert the action item with an x-axis coordinate position of 150 pixels.

In some implementations, the client device can interrupt the processing of the scroll event, responsive to determining that another portion of the information resource below the content item slot will be displayed subsequent processing the scroll event. In some implementations, the client device can determine that the content item slot is within the range of the viewport. In some implementations, the client device can determine that processing the scroll event would display another portion of the information resource below the content item slot of the information resource. For example, the client device can determine content item slot fully spans the size of the viewport. The client device can then identify that the scroll direction is downward and the scroll amount from the one or more scroll parameters of the scroll event. In this example, the client device can determine that the portion that will come into the range of the viewport will be below the content item slot based on the scroll parameters identified. The client device can subtract the scroll amount from the one or more scroll parameters when processing the scroll event. In this example, visually, the portion of the information resource within the viewport is prevented from down past the content item slot. In some implementations, the client device can adjust the scroll speed of the scroll event, when the content item slot is within range of the viewport. For example, rather than subtracting the entire scroll amount when processing the scroll event, the client device can subtract a fraction (e.g., 25-75%) of the scroll amount when processing the scroll event.

In some implementations, the client device can allow the processing of the scroll event, responsive to detecting a click event on the content item inserted in the content item slot. In some implementations, the client device can detect the click event on the action item inserted in the content item. For example, once the client device detects a click event on a button on the content item inserted in the content item slot, the client device can resume the processing of another scroll event, thereby enabling the portion of the information resource within the viewport to move down past the content item slot.

FIG. 5 shows the general architecture of an illustrative computer system 500 that may be employed to implement any of the computer systems discussed herein (including the system 110 and its components such as the content request module 130, the content selection module 135, and script provider module 140) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 110 such as the content request module 130, the content selection module 135, the script provider module 140, the location identification module 225, the event detection module 230, and the content insertion module 235, among others.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 525 to store information related to the availability of inventory of one or more content units, reservations of one or more content units, among others. The memory 525 can include the database 145. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 50. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 50.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130, the content selection module 135, and the script provider module 140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130, the content selection module 135, and the script provider module 140 can be part of the data processing system 110, a single module, a logic device having one or more processing modules, one or more servers, or part of a search engine. In addition, the location identification module 225, the event detection module 230, and the content insertion module 235 can be part of the client device 125, a single module, or a logic device having one or more processing module.

It has been described above that third-party content providers provide third-party content items for display on end-user computing devices dynamically based on events and signals of the client device so as to reduce the bandwidth and latency introduced due to the number of content requests transmitted to a third-party content server. It will be appreciated that the content may take any convenient form such as user interface components that are dynamically provided to a user based upon the user's interactions with the interface so as to provide an improved user interface. The content items may additionally or alternatively comprise images, text or video data or may take the form of advertisements. Where the content takes the form of advertisements, the data processing system can include an advertising auction system configured to host auctions. In some implementations, the data processing system does not include the advertising auction system but is configured to communicate with the advertising auction system via the network 105. The third party content provider may be an advertiser. The content placement system may, for example, be an ad server or ad placement system. In some implementations, the data processing system can receive the content item from an ad auction system that can select content for display based on an ad auction. The ad auction system can select an ad from a plurality of ads based on ad auction parameters, such as bid values, size of ad, click-through rate (CTR), cost per mille (CPM), and impression rate, among others. The ad auction system can select the ad from the plurality of ads further based on size specifications of the respective ad and ad performance from previous presentation of the respective ad. In some implementations, the content selection module 135 can receive the content item from an ad auction system that can select the content item for display based on an ad auction. The ad auction system can select an ad from a plurality of ads based on ad auction parameters, such as bid values, size of ad, click-through rate (CTR), cost per mille (CPM), and impression rate, among others. The ad auction system can select the ad from the plurality of ads further based on size specifications of the respective ad and ad performance from previous presentation of the respective ad.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation." "some implementations," "an alternate implementation," "various implementation." "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to attributing a scroll event on an application, the systems and methods described herein can include applied to other environments. The foregoing implementations are illustrative rather than limiting of the described systems and methods. Scope of the systems and methods described herein is thus indicated by the appended claims, rather than the foregoing description.

What is claimed is:

1. A method of dynamically selecting a third-party content slot in an information resource, comprising:
  receiving, by a client device having one or more processors via a network, the information resource for display within a viewport of an application executing on the client device, the information resource having one or more elements;
  identifying, by the client device, prior to detection of any scroll events, a first candidate content insertion location and a second candidate content insertion location for insertion of a third-party content item based on locations of the one or more elements on the information resource, wherein the second candidate content insertion location is below the first candidate content insertion location on the information resource, and wherein the first candidate content insertion location and the second candidate content insertion location are below the portion of the information resource visible within the viewport of the application while a top of the information resource is visible within the viewport;
  receiving, by the client device, the third-party content item for insertion at one of the first candidate content insertion location or the second candidate content insertion location of the information resource;
  monitoring, by the client device, for a scroll event on the information resource, the scroll event having one or more scroll parameters;
  identifying, by the client device, based on the one or more scroll parameters of the scroll event, a first portion of the information resource to be displayed within the viewport of the application subsequent to processing the event;
  determining, by the client device, that the first candidate content insertion location is above the first portion and that the second candidate insertion location is within or below the viewport;
  selecting, by the client device, within the information resource, the second candidate content insertion location as the third-party content slot responsive to determining that the first candidate content insertion location is above the first portion and that the second candidate insertion location is within or below the viewport; and
  inserting, by the client device, the third-party content item for display in the third-party content slot set on the information resource.

2. The method of claim 1, further comprising:
  identifying, by the client device, a viewport size of the viewport of the application;

setting, by the client device, a slot size of the third-party content slot based on the viewport size of the viewport of the application; and modifying, by the client device, the third-party content item to substantially match the slot size of the of the third-party content slot to fit the third-party content item within the third-party content slot.

3. The method of claim 1, wherein the one or more scroll parameters includes a scroll speed corresponding to the scroll event; and further comprising:

determining, by the client device, based on the scroll speed and subsequent to processing the scroll event, that a second portion of the information resource corresponding to the first candidate content insertion location is above the first portion of the information resource that is within the viewport of the application; and inserting, by the client device, responsive to determining that the second portion of the information resource corresponding to the first candidate content insertion location is above the first portion of the information resource that is within the viewport of the application, the third-party content slot at the second candidate content insertion location for displaying the received third-party content item.

4. The method of claim 1, further comprising:

receiving, by the client device, a plurality of input actions performed on a touchscreen of the client device;

determining, by the client device, locations on the touchscreen at which the input actions were performed;

determining, by the client device, based on the locations on the touchscreen at which the input actions were performed, a range of coordinates of the touchscreen on which the input actions were performed; and inserting, by the client device, an action item to interact with the third-party content item at a location on the third-party content item that corresponds to the range of coordinates of the touchscreen on which the input actions were performed when the third-party content item is displayed within the third-party content slot.

5. The method of claim 1, further comprising:

receiving, by the client device, a conversion prediction value calculated by a remote device, the conversion prediction value indicating a likelihood of a conversion event on the content item; and determining, by the client device, that the conversion prediction value is above a conversion likelihood threshold, wherein selecting the third-party content slot is responsive to determining that the conversion prediction value is above the conversion likelihood threshold.

6. The method of claim 1, further comprising:

identifying, by the client device, a height and a width of the viewport of the application, wherein selecting the third-party content slot further comprises setting a height of the third-party content slot to the height of the viewport and a width of the third-party content slot to the width of the viewport, and wherein the third party content item has a height equal to the height of the viewport and a width equal to the width of the viewport.

7. The method of claim 1, further comprising:

interrupting the scroll event to display the first portion of the information resource.

8. The method of claim 1, further comprising:

identifying, by the client device, a size of the information resource;

comparing, by the client device, the size of the information resource to a threshold page size; and transmitting, by the client device, responsive to determining that the size of the information resource is greater than the threshold page size, a request for third-party content, wherein receiving the third-party content item further comprises receiving the third-party content item subsequent to transmitting the request for third-party content.

9. The method of claim 8, wherein the size of the information resource corresponds to at least one of a height or a width of the information resource.

10. A system for dynamically selecting a third-party content slot in an information resource, comprising:

a client device having one or more processors, configured to:

receive, via a network, the information resource for display within a viewport of an application executing on the client device, the information resource having one or more elements;

identify, prior to detection of any scroll events, a first candidate content insertion location and a second candidate content insertion location for insertion of a third-party content item based on locations of the one or more elements on the information resource, wherein the second candidate content insertion location is below the first candidate content insertion location on the information resource, and wherein the first candidate content insertion location and the second candidate content insertion location are below the portion of the information resource visible within the viewport of the application while a top of the information resource is visible within the viewport;

receive the third-party content item for insertion at one of the first candidate content insertion location or the second candidate content insertion location of the information resource;

monitor for a scroll event on the information resource, the scroll event having one or more scroll parameters;

identify, based on the one or more scroll parameters of the scroll event, a first portion of the information resource to be displayed within the viewport of the application subsequent to processing the event;

determine that the first candidate content insertion location is above the first portion and that the second candidate insertion location is within or below the viewport;

select, within the information resource, a third-party content slot at the second candidate insertion location as the third-party content slot responsive to determining that the first candidate content insertion location is above the first portion and that the second candidate insertion location is within or below the viewport; and insert the third-party content item for display in the third-party content slot set on the information resource.

11. The system of claim 10, wherein the client device is further configured to:

identify a viewport size of the viewport of the application;

set a slot size of the third-party content slot based on the viewport size of the viewport of the application; and modify the third-party content item to substantially match the slot size of the of the third-party content slot to fit the third-party content item within the third-party content slot.

12. The system of claim 10, wherein the one or more scroll parameters includes a scroll speed corresponding to the scroll event; wherein the client device is further configured to:
   determine based on the scroll speed and subsequent to processing the scroll event, that a second portion of the information resource corresponding to the first candidate content insertion location is above the first portion of the information resource that is within the viewport of the application; and
   insert, responsive to determining that the second portion of the information resource corresponding to the first candidate content insertion location is above the first portion of the information resource that is within the viewport of the application, the third-party content slot at the second candidate content insertion location for displaying the received third-party content item.

13. The system of claim 10, wherein the client device is further configured to:
   receive a plurality of input actions performed on a touchscreen of the client device;
   determine locations on the touchscreen at which the input actions were performed;
   determine, based on the locations on the touchscreen at which the input actions were performed, a range of coordinates of the touchscreen on which the input actions were performed; and
   insert an action item to interact with the third-party content item at a location on the third-party content item that corresponds to the range of coordinates of the touchscreen on which the input actions were performed when the third-party content item is displayed within the third-party content slot.

14. The system of claim 10, wherein the client device is further configured to:
   receive a conversion prediction value calculated by a remote device, the conversion prediction value indicating a likelihood of a conversion event on the content item; and
   determine that the conversion prediction value is above a conversion likelihood threshold,
   wherein selecting the third-party content slot is responsive to determining that the conversion prediction value is above the conversion likelihood threshold.

15. The system of claim 10, wherein the client device is further configured to:
   identify a height and a width of the viewport of the application;
   wherein selecting the third-party content slot further comprises setting a height of the third-party content slot to the height of the viewport and a width of the third-party content slot to the width of the viewport, and
   wherein third-party content item has a height equal to the height of the viewport and a width equal to the width of the viewport.

16. The system of claim 10, wherein the client device is further configured to:
   interrupt the scroll event to display the first portion of the information resource.

17. The system of claim 10, wherein the client device is further configured to:
   identify a size of the information resource;
   compare the size of the information resource to a threshold page size; and
   transmit, responsive to determining that the size of the information resource is greater than the threshold page size, a request for third-party content,
   wherein receiving the third-party content item further comprises receiving the third-party content item subsequent to transmitting the request for third-party content.

18. The system of claim 17, wherein the size of the information resource corresponds to at least one of a height or a width of the information resource.

* * * * *

UNITED STATES PATENT AND TRADEMARK OFFICE
CERTIFICATE OF CORRECTION

PATENT NO. : 12,154,144 B2  
APPLICATION NO. : 18/198480  
DATED : November 26, 2024  
INVENTOR(S) : Matthew Burriesci et al.

It is certified that error appears in the above-identified patent and that said Letters Patent is hereby corrected as shown below:

In the Claims

At Column 41, Line 5, "of the of the" should be -- of the --.

At Column 42, Lines 53-54, "resource, a third-party content slot at" should be -- resource, --.

At Column 43, Line 2, "of the of the" should be -- of the --.

Signed and Sealed this
Eighteenth Day of March, 2025

Coke Morgan Stewart
*Acting Director of the United States Patent and Trademark Office*